(12) United States Patent
Nissen et al.

(10) Patent No.: US 11,629,600 B2
(45) Date of Patent: Apr. 18, 2023

(54) METHODS OF CUSTOMIZING, MANUFACTURING, AND REPAIRING A ROTOR BLADE USING ADDITIVE MANUFACTURING PROCESSES AND A ROTOR BLADE INCORPORATING THE SAME

(71) Applicant: Bell Textron Inc., Fort Worth, TX (US)

(72) Inventors: Jeffrey Nissen, Alba, TX (US); Jared M. Paulson, Fort Worth, TX (US); Thomas S. Chiang, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 344 days.

(21) Appl. No.: 16/822,716

(22) Filed: Mar. 18, 2020

(65) Prior Publication Data

US 2020/0217206 A1    Jul. 9, 2020

Related U.S. Application Data

(62) Division of application No. 15/658,928, filed on Jul. 25, 2017, now Pat. No. 10,633,976.

(51) Int. Cl.
*F01D 5/14* (2006.01)
*F03B 3/12* (2006.01)
(Continued)

(52) U.S. Cl.
CPC ............... *F01D 5/147* (2013.01); *B22F 5/04* (2013.01); *B22F 7/062* (2013.01); *B22F 10/85* (2021.01);
(Continued)

(58) Field of Classification Search
CPC ........ F01D 5/147; F01D 5/005; F01D 25/005; F01D 25/06; F01D 5/282; F01D 5/183;
(Continued)

(56) References Cited

U.S. PATENT DOCUMENTS 6,054,200 A    4/2000 Woods
6,764,280 B2    7/2004 Sehgal et al.
(Continued)

FOREIGN PATENT DOCUMENTS

EP    0764764 A1    3/1997
EP    2572979 A1    3/2013
(Continued)

OTHER PUBLICATIONS

Office Action, dated Jun. 15, 2021, by the USPTO, re U.S. Appl. No. 16/264,623.
(Continued)

*Primary Examiner* — Eric J Zamora Alvarez
(74) *Attorney, Agent, or Firm* — Timmer Law Group, PLLC

(57) ABSTRACT

An airfoil member having a root end, a tip end, a leading edge, and a trailing edge, the airfoil member including an upper skin; a lower skin; and a support network having a plurality of interconnected support members in a lattice arrangement and/or a reticulated arrangement, the support network being configured to provide tailored characteristics of the airfoil member. Also provided are methods and systems for repairing an airfoil member.

14 Claims, 16 Drawing Sheets

(51) Int. Cl.

| | | |
|---|---|---|
| *F03D 1/06* | (2006.01) | |
| *B22F 5/04* | (2006.01) | |
| *B64C 11/26* | (2006.01) | |
| *B33Y 80/00* | (2015.01) | |
| *B33Y 10/00* | (2015.01) | |
| *B29C 64/386* | (2017.01) | |
| *B64F 5/40* | (2017.01) | |
| *B64C 27/473* | (2006.01) | |
| *B64F 5/10* | (2017.01) | |
| *B22F 7/06* | (2006.01) | |
| *B33Y 50/00* | (2015.01) | |
| *G06F 30/17* | (2020.01) | |
| *G06F 30/23* | (2020.01) | |
| *B22F 10/85* | (2021.01) | |
| *B33Y 50/02* | (2015.01) | |
| *B23K 26/342* | (2014.01) | |
| *B23K 15/00* | (2006.01) | |
| *B23P 6/00* | (2006.01) | |
| *B29C 73/04* | (2006.01) | |
| *F01D 5/00* | (2006.01) | |
| *B29L 31/08* | (2006.01) | |
| *B22F 10/12* | (2021.01) | |
| *B22F 10/18* | (2021.01) | |
| *B22F 10/25* | (2021.01) | |
| *B22F 10/28* | (2021.01) | |
| *B22F 10/47* | (2021.01) | |

(52) U.S. Cl.
CPC ........ *B23K 15/0086* (2013.01); *B23K 26/342* (2015.10); *B23P 6/007* (2013.01); *B29C 64/386* (2017.08); *B29C 73/04* (2013.01); *B33Y 10/00* (2014.12); *B33Y 50/00* (2014.12); *B33Y 50/02* (2014.12); *B33Y 80/00* (2014.12); *B64C 11/26* (2013.01); *B64C 27/473* (2013.01); *B64F 5/10* (2017.01); *B64F 5/40* (2017.01); *F01D 5/005* (2013.01); *F03B 3/121* (2013.01); *G06F 30/17* (2020.01); *G06F 30/23* (2020.01); *B22F 10/12* (2021.01); *B22F 10/18* (2021.01); *B22F 10/25* (2021.01); *B22F 10/28* (2021.01); *B22F 10/47* (2021.01); *B22F 2007/068* (2013.01); *B29L 2031/08* (2013.01); *B29L 2031/082* (2013.01); *B29L 2031/085* (2013.01); *B29L 2031/087* (2013.01); *B64C 2027/4736* (2013.01); *F03D 1/0675* (2013.01); *F05B 2230/00* (2013.01); *F05B 2230/103* (2013.01); *F05B 2230/30* (2013.01); *F05B 2240/30* (2013.01); *F05B 2250/28* (2013.01); *F05B 2250/283* (2013.01); *F05B 2260/84* (2013.01); *F05D 2220/36* (2013.01); *F05D 2230/50* (2013.01); *F05D 2230/80* (2013.01); *F05D 2240/301* (2013.01)

(58) Field of Classification Search
CPC ... F01D 5/18; F01D 5/184; F01D 5/28; F01D 5/286; F03B 3/121; F03D 1/0675; F05B 2240/30; F05B 2250/28; F05B 2250/283; F05D 2300/612; F05D 2240/305; F05D 2240/301; F05D 2300/514; F05D 2250/283; F05D 2250/28; F05D 2250/132; F05D 2260/204; F04D 29/324; F04D 29/388; B22F 7/006; B22F 2207/17; B22F 5/04; B22F 7/062; B33Y 80/00; B29L 2031/08; B29L 2031/082; B29L 2031/085; B29L 2031/087; B64C 2027/4736; B64C 11/26; B64C 27/473; B29C 73/04

See application file for complete search history.

(56) References Cited

U.S. PATENT DOCUMENTS

| | | | |
|---|---|---|---|
| 6,995,334 B1 | 2/2006 | Kovacevic et al. | |
| 7,097,427 B2 | 8/2006 | Kuhns et al. | |
| 7,144,222 B2 * | 12/2006 | Lanni ..................... | B63H 1/26 |
| | | | 416/233 |
| 7,657,988 B2 | 2/2010 | Greene | |
| 9,129,908 B2 | 9/2015 | Savic et al. | |
| 9,364,930 B2 | 4/2016 | Hethcock et al. | |
| 9,352,421 B2 | 5/2016 | Illston | |
| 9,414,497 B2 | 8/2016 | Savic | |
| 9,429,023 B2 | 8/2016 | Godfrey et al. | |
| 9,579,714 B1 | 2/2017 | Rutkowski | |
| 9,636,229 B2 | 5/2017 | Lang et al. | |
| 10,633,976 B2 | 4/2020 | Nissen et al. | |
| 11,427,350 B2 | 8/2022 | Rivera | |
| 2011/0054850 A1 | 3/2011 | Roach | |
| 2011/0311389 A1 | 12/2011 | Ryan et al. | |
| 2012/0201686 A1 | 8/2012 | Fromentin et al. | |
| 2013/0071562 A1 | 3/2013 | Szuromi et al. | |
| 2013/0195671 A1 * | 8/2013 | El-Wardany ............ | C23C 14/28 |
| | | | 427/299 |
| 2013/0224008 A1 | 8/2013 | Cheung et al. | |
| 2013/0276461 A1 | 10/2013 | Propheter-Hinckley et al. | |
| 2013/0294891 A1 | 11/2013 | Neuhaeusler et al. | |
| 2014/0301856 A1 | 10/2014 | Oldroyd et al. | |
| 2015/0345396 A1 | 12/2015 | Zelesky et al. | |
| 2016/0115822 A1 | 4/2016 | Cortequisse | |
| 2016/0303818 A1 | 10/2016 | Thiagarajan et al. | |
| 2016/0319678 A1 | 11/2016 | Staroselsky et al. | |
| 2017/0101871 A1 | 4/2017 | Tiedermann et al. | |
| 2017/0128184 A1 | 5/2017 | Sufyan et al. | |
| 2017/0204833 A1 | 7/2017 | Bensely et al. | |
| 2017/0217109 A1 | 8/2017 | Measom et al. | |
| 2017/0259329 A1 | 9/2017 | Felwor | |
| 2018/0038385 A1 * | 2/2018 | Welch ..................... | B22F 10/20 |
| 2018/0079482 A1 | 3/2018 | Ivans et al. | |
| 2019/0017388 A1 * | 1/2019 | El-Wardany ............ | F01D 5/147 |
| 2019/0032491 A1 | 1/2019 | Nissen et al. | |
| 2019/0193829 A1 | 6/2019 | Schleuter | |
| 2020/0114573 A1 | 4/2020 | TenHouten et al. | |
| 2020/0247561 A1 | 8/2020 | Rivera | |

FOREIGN PATENT DOCUMENTS

| | | | |
|---|---|---|---|
| EP | 2708463 | B1 | 6/2015 |
| EP | 2942424 | A2 | 11/2015 |
| EP | 3028793 | A1 | 6/2016 |
| EP | 3147069 | A1 | 3/2017 |
| EP | 3435259 | A1 | 1/2019 |
| EP | 3435259 | B1 | 8/2022 |
| WO | 2016184685 | A1 | 11/2016 |

OTHER PUBLICATIONS

EP Exam Report, dated Jun. 24, 2021, by the EPO, re EP App No. 17198169.9.
European Search Report, dated Jul. 16, 2018, by the EPO, re EP Patent Application No. 17198169.9.
European Examination Report, dated Aug. 1, 2018, by the EPO, re EP Patent Application No. 17198169.9.
European Examination Report, dated Feb. 6, 2019, by the EPO, re EP Patnet App No. 17198169.9.
Office Action—Restriction, dated Feb. 28, 2019, by the USPTO, re U.S. Appl. No. 15/658,928.
Ji-Hong Zhu et al.; Topology Optimization in Aircraft and Aerospace Structures Design; Archives of Computational Methods in Engineering; vol. 3, No. 4; Apr. 14, 2015; pp. 595-622.
Ozdemir Zuhal et al.; Energy absorption in lattice structures in dynamic: Experiments; International Journal of Impact Engineering; Pergamon, GB; vol. 89; Nov. 17, 2015; pp. 49-61.

(56) References Cited

OTHER PUBLICATIONS

Mason; Moving continuous-fiber 3D printing into production; Mar. 1, 2019; https://www.compositesworld.com/blog/post/moving-continuous-fiber-3d-printing-into-production.
Office Action, dated Jun. 28, 2019, by the USPTO, re U.S. Appl. No. 15/658,928.
EP Exam Report, dated Oct. 21, 2019, by the EPO, re EP Patent App No. 17198169.9.
Notice of Allowance, dated Jan. 15, 2020, by the USPTO, re U.S. Appl. No. 15/658,928.
EP Exam Report, dated Apr. 22, 2020, by the EPO, re EP Patent App No. 17198169.9.
Notice of Allowance, dated Jun. 2, 2022, by the USPTO, re U.S. Appl. No. 16/264,623.
Decision to Grant, dated Jul. 7, 2022, by the EPO, re EP Application No. 17198169.9.

\* cited by examiner

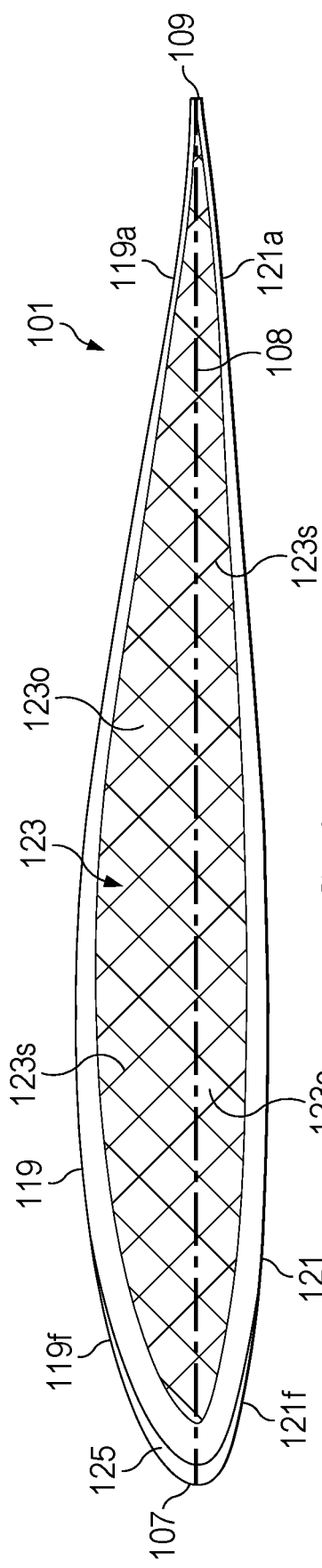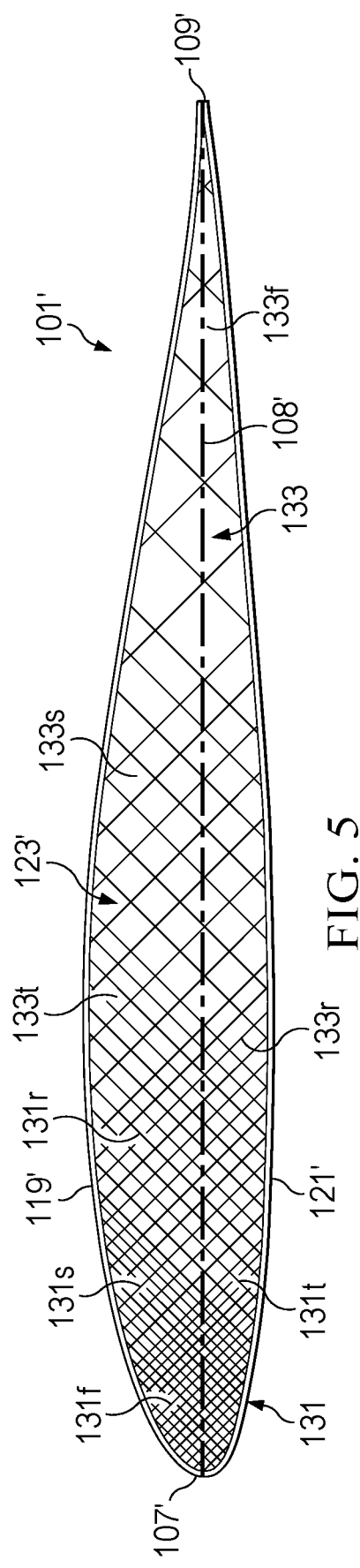

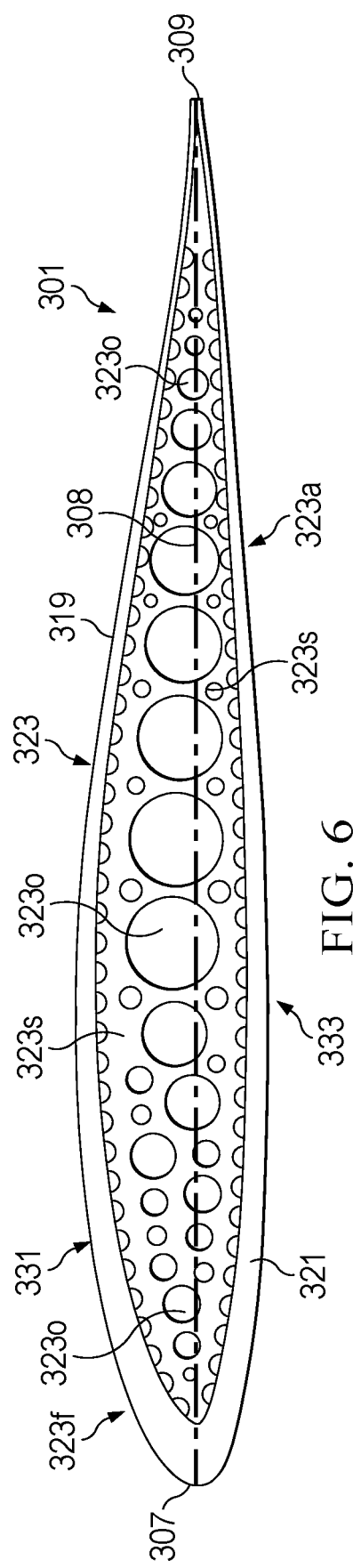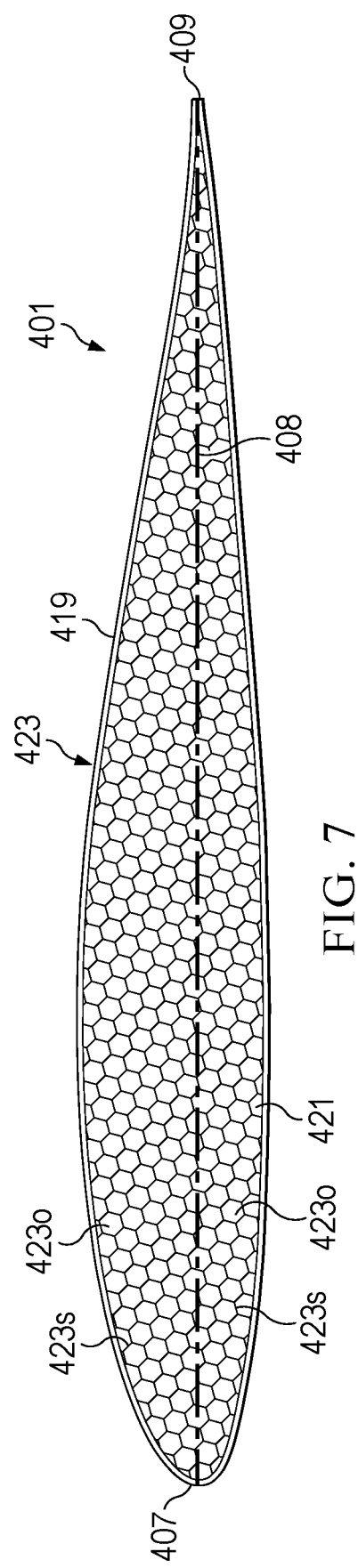

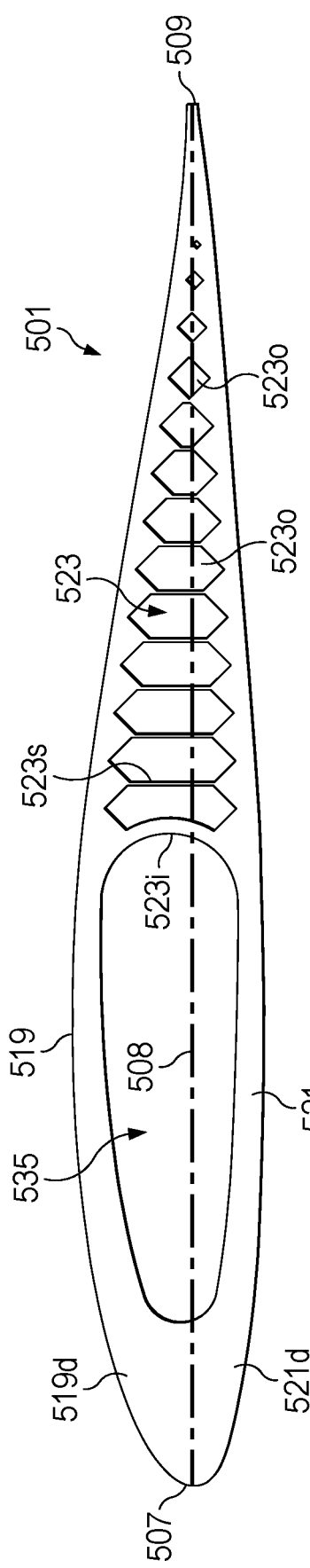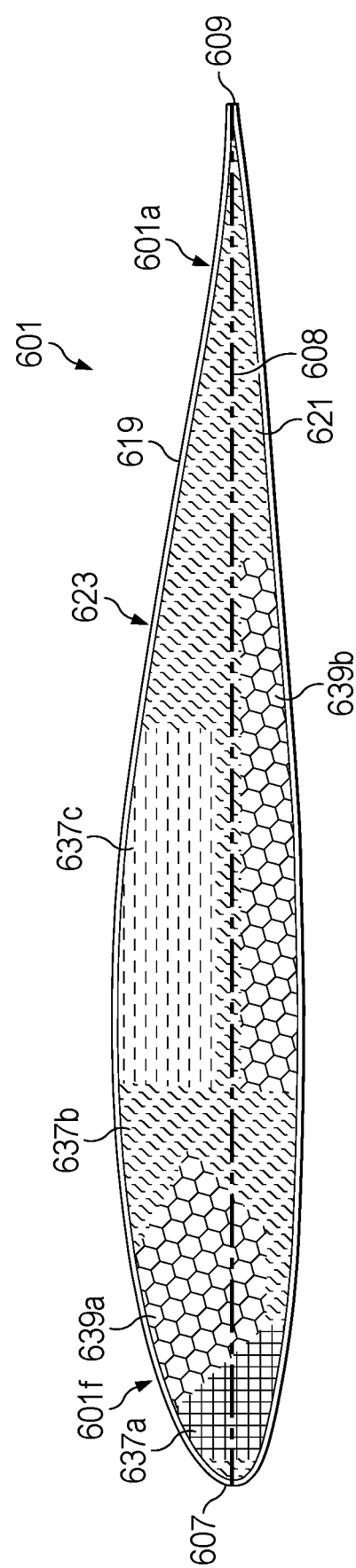

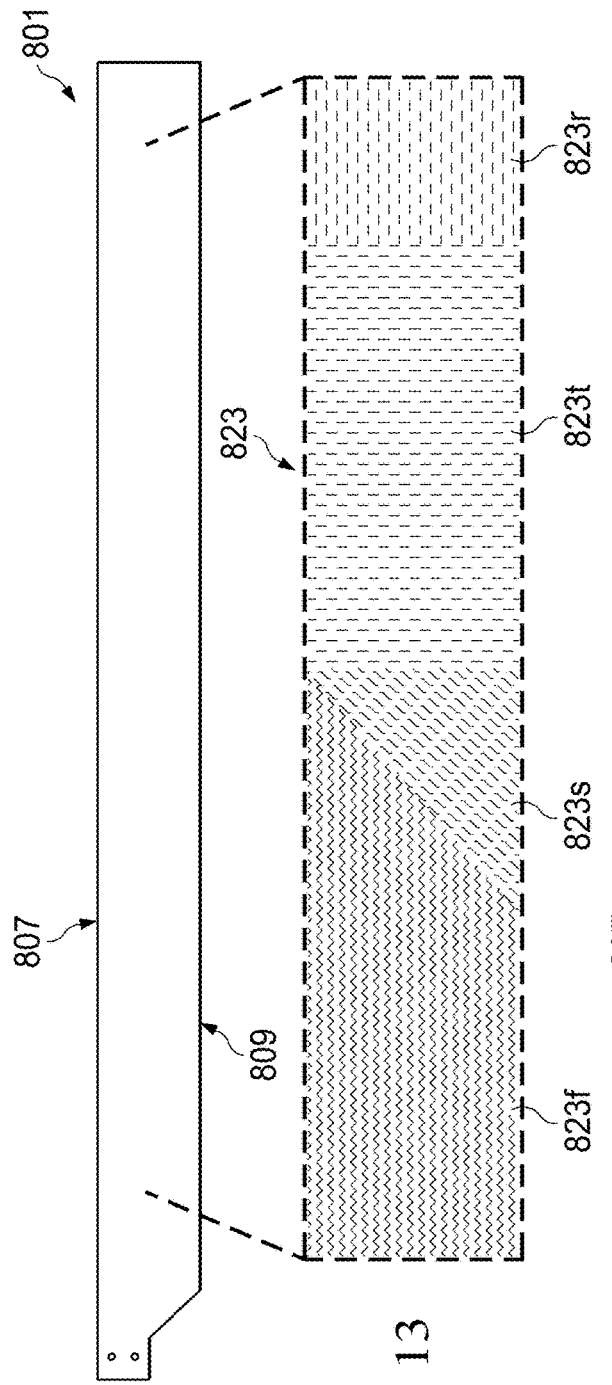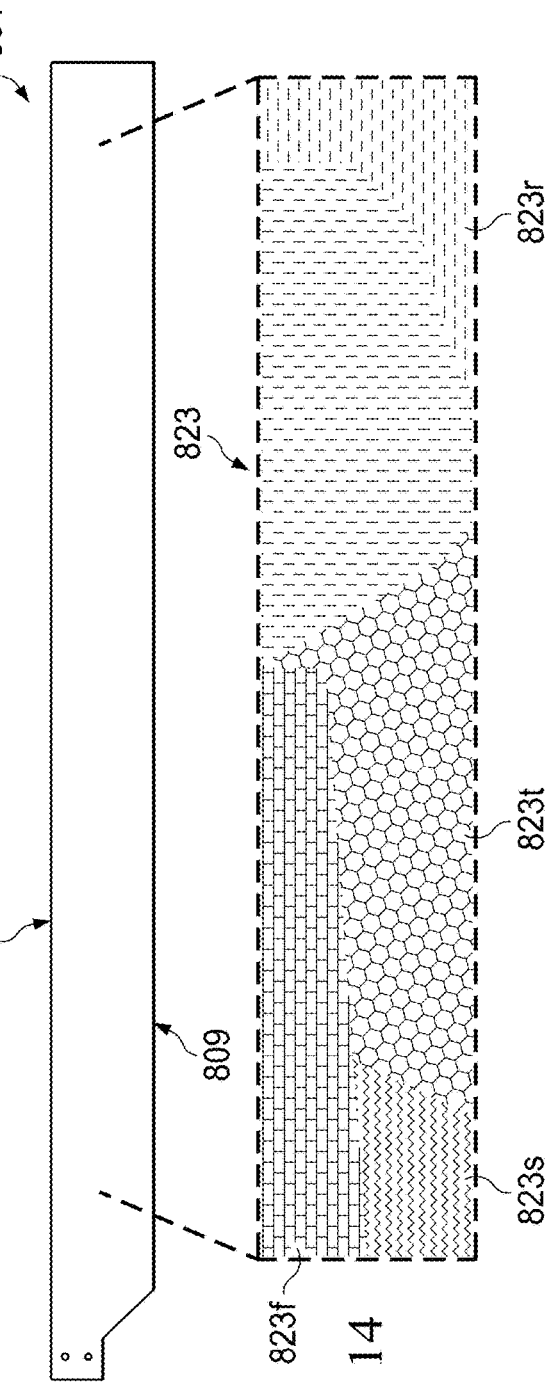

METHODS OF CUSTOMIZING, MANUFACTURING, AND REPAIRING A ROTOR BLADE USING ADDITIVE MANUFACTURING PROCESSES AND A ROTOR BLADE INCORPORATING THE SAME

CROSS-REFERENCE TO RELATED APPLICATION

This application is a divisional of U.S. patent application Ser. No. 15/658,928, filed Jul. 25, 2017. The disclosure of which is hereby incorporated by reference.

BACKGROUND

Technical Field

The present disclosure relates to an aircraft rotor blade, as well as a method of making a rotor blade.

Description of Related Art

Conventional aircraft rotor blades have been manufactured using a time-consuming, multi-step process involving the fabrication of several detail parts that are separately assembled to form the full rotor blade structure. Rotor blades have specific structural and dynamic requirements, which historically has driven manufacturers to separate rotor blade design and manufacture into several detail parts and sub-assemblies. Historically in the aerospace industry, the design and manufacture of multiple detail parts and sub-assemblies provides more control over the process and ensures that the assembled rotor blade meets stringent operational requirements. Oftentimes a designated set of expensive tools in a particular location is needed to manufacture each individual blade component, which can require thousands of feet in shop floor space. With the existing methods of manufacture, it is extremely difficult to produce an entire blade in a few steps due to the variation in movement and physical and chemical changes exhibited by the different polymeric and metallic materials when exposed to changes in pressure and temperature.

For example, a conventional composite rotor blade includes a spar member that is configured to provide primary structural integrity to the rotor blade. The spar member is typically required to react to dynamic operational loads, such as aerodynamic, inertial, and centrifugal loads. The spar member is only part of the rotor blade body, thus considerable effort must be made to integrate structural load paths between the spar member and the rest of the rotor blade body and skins. A spar member must typically be separately cured prior to assembly with the other rotor blade members, which can increase manufacturing costs.

There is a need to improve structural efficiency in a rotor blade, as well as decrease expenses associated with the manufacturing of a rotor blade.

SUMMARY

In a first aspect, there is a method of making a rotor blade, including designing at least one of an upper skin, a lower skin, a support network, and components therefor; and forming at least one of the upper skin, the lower skin, a support network, and components therefor using an additive manufacturing process.

In an embodiment, the additive manufacturing process includes at least one of the following: electron beam melting, selective laser sintering, selective laser melting (SLM), stereolithography, direct metal laser sintering, three-dimensional printing, fused deposition modeling, laser curing and lasered engineered net shaping.

In one embodiment, the method of making further includes providing inputs; providing a data library; and the step of designing is based, at least in part, on the inputs and the data library.

In another embodiment, the data library includes dynamic performance data, characteristics of materials, support network arrangement parameters, upper skin parameters, and lower skin parameters.

In still another embodiment, the method further includes generating at least one of a virtual upper skin, a virtual lower skin, and a virtual support member; wherein the forming step is based, at least in part, on at least one of the virtual upper skin, the virtual lower skin, and the virtual support member.

In a second aspect, there is an airfoil member having a root end, a tip end, a leading edge, and a trailing edge, the airfoil member including an upper skin; a lower skin; and a support network having a plurality of interconnected support members in a lattice arrangement, the support network being configured to provide tailored characteristics of the airfoil member.

In an embodiment, at least one of the upper skin and the lower skin are configured to provide tailored characteristics of the airfoil member.

In one embodiment, the plurality of interconnected support members define a plurality of openings, the plurality of openings including at least one of the following shapes: square, triangle, rectangle, polygon, diamond, pentagon, octagon, trapezoid.

In another embodiment, the support network includes a closely compacted portion.

In still another embodiment, the support network includes an open cell portion.

In yet another embodiment, at least a portion of the support members have an uneven thickness.

In an embodiment, the airfoil member is one piece.

In a third aspect, there is provided an airfoil member having a root end, a tip end, a leading edge, and a trailing edge, the airfoil member including an upper skin; a lower skin; and a support network having a plurality of interconnected support members in a reticulated arrangement, the support network being configured to provide tailored characteristics of the airfoil member.

In an embodiment, at least one of the upper skin and the lower skin are configured to provide tailored characteristics of the airfoil member.

In one embodiment, the plurality of interconnected support members define a plurality of openings, the plurality of openings including at least one of the following shapes: round; an elongated, globule; non-uniform, biomimetic shapes, and combinations thereof.

In an embodiment, the support network includes a closely compacted portion.

In another embodiment, the support network includes an open cell portion.

In one embodiment, at least a portion of the support members have an uneven thickness.

In an embodiment, the airfoil member is one piece.

In a fourth aspect, there is a method of repairing an airfoil member, including removing a damaged portion of the airfoil member to form a cavity; designing at least one of a virtual upper skin, a virtual lower skin, a virtual support network, and components therefor for the cavity; forming at least one of the upper skin, the lower skin, a support network, and components therefor using an additive manufacturing process; and bonding the at least one of the upper skin, the lower skin, the support network, and components therefor to the cavity in the airfoil member.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 4-7 and 9-11 are cross-sectional views of illustrative embodiments of the rotor blade taken from section lines A-A in FIG. 3;

FIGS. 12-14 are top schematic views of support networks in rotor blades, according to illustrative embodiments;

DESCRIPTION OF THE PREFERRED EMBODIMENT

Illustrative embodiments of methods, apparatuses, and systems for customizing, manufacturing, and repairing a rotor blade using additive manufacturing processes are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, apparatuses, etc. described herein may be oriented in any desired direction.

Figure 1:
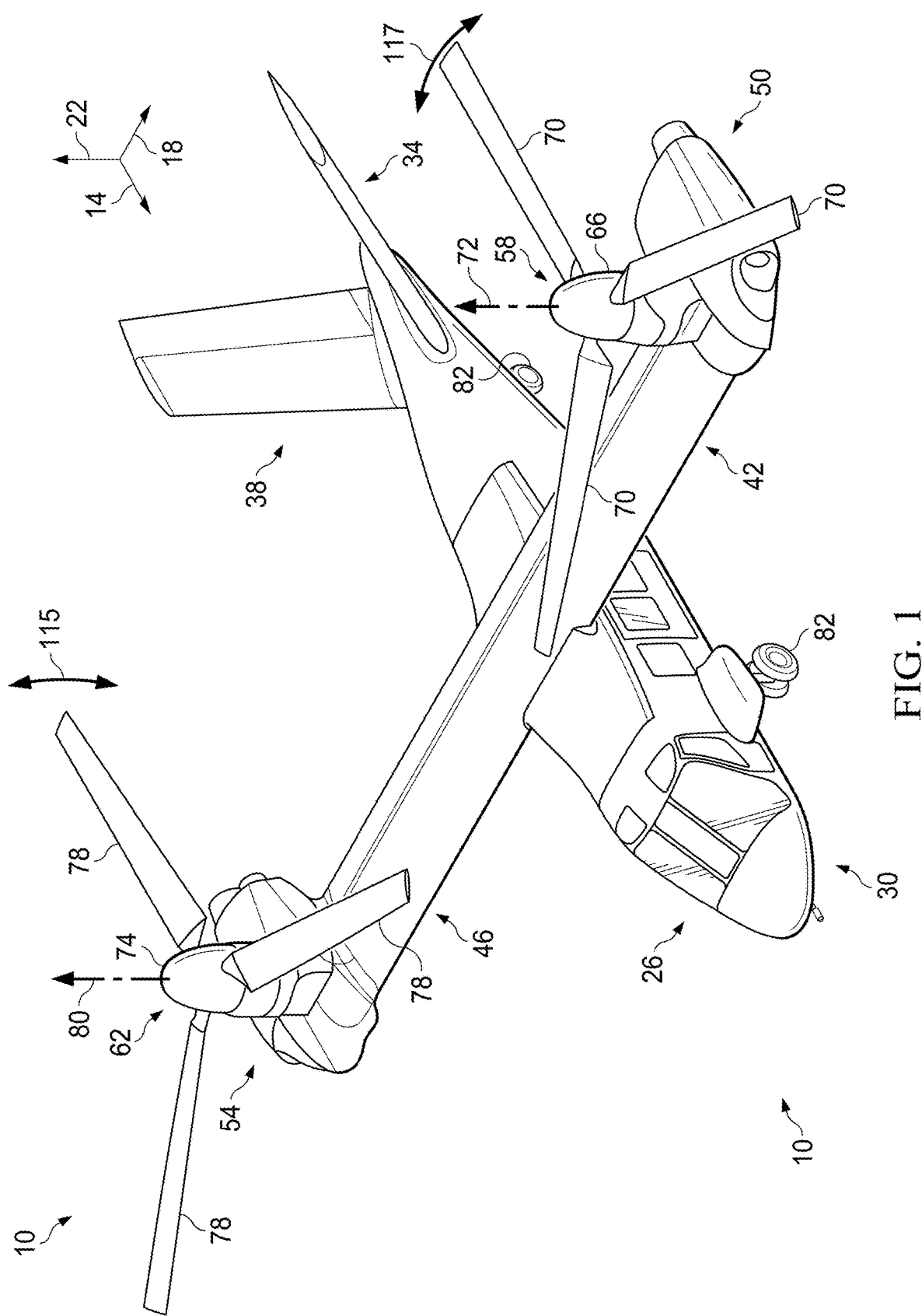
FIG. 1 is a perspective view of an aircraft, according to one example embodiment.
Figure 2:
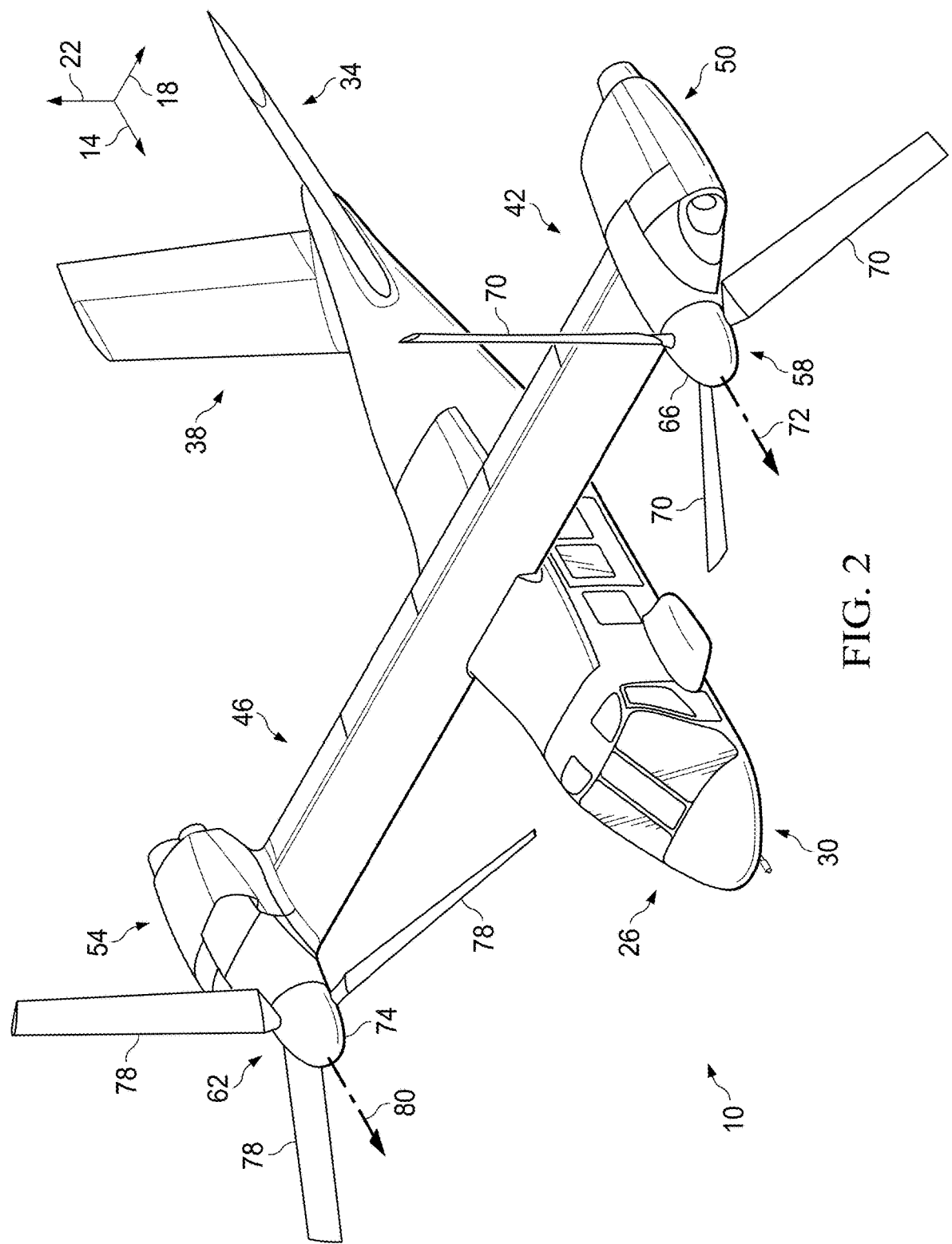
FIG. 2 is another perspective view of an aircraft, according to one example embodiment.

FIGS. 1-2 depict aircraft 10 as a tiltrotor aircraft. FIGS. 1-2 depict three mutually orthogonal directions X, Y, and Z forming a three-dimensional frame of reference XYZ. Longitudinal axis X 14 corresponds to the roll axis that extends through the center of aircraft 10 in the fore and after directions. Transverse axis Y 18 is perpendicular to longitudinal axis 14 and corresponds to the pitch axis (also known as a control pitch axis or "CPA"). The X-Y plane is considered to be "horizontal." Vertical axis Z 22 is the yaw axis and is oriented perpendicularly with respect to the X-Y plane. The X-Z plane and Y-Z plane are considered to be "vertical."

Aircraft 10 includes fuselage 26 as a central main body. Fuselage 26 extends parallel to longitudinal axis 14 from a fuselage front end 30 to a fuselage rear end 34. Aircraft 10 further includes tail member 38 extending from fuselage rear end 34 of fuselage 26. Aircraft 10 includes wing 42 and wing 46 extending from fuselage 26 substantially parallel to transverse axis Y 18. Wing 42 is coupled to propulsion system 50, and wing 46 is coupled to propulsion system 54. Propulsion system 50 includes rotor assembly 58, and propulsion system 54 includes rotor assembly 62. Rotor assembly 58 includes rotor hub 66 and plurality of rotor blades 70 extending from rotor hub 66 and configured to rotate about axis 72. Similarly, rotor assembly 62 includes rotor hub 74 and plurality of rotor blades 78 extending from rotor hub 74 and configured to rotate about axis 80. Each of rotor assemblies 58 and 62 can, for example, be coupled to and controlled with an engine and gearbox connected to a driveshaft, such as one continuous driveshaft extending from propulsion system 50 to propulsion system 54 or a segmented driveshaft separated by a gearbox.

Rotor assemblies 58 and 62 are controllable and positionable to, for example, enable control of direction, thrust, and lift of aircraft 10. For example, FIG. 1 illustrates aircraft 10 in a first configuration, in which propulsion systems 50 and 54 are positioned to provide a lifting thrust to aircraft 10, if activated. In the embodiment shown in FIG. 1, propulsion systems 50 and 54 are positioned such that, if activated, aircraft 10 moves substantially in the Z direction ("helicopter mode"). In the embodiment shown in FIG. 1, aircraft 10 further includes landing gear 82 with which aircraft 10 can contact a landing surface.

FIG. 2 illustrates aircraft 10 in a second configuration, in which propulsion systems 50 and 54 are positioned to provide a forward thrust to aircraft 10, if activated. In the embodiment shown in FIG. 2, propulsion systems 50 and 54 are positioned such that, if activated, aircraft 10 moves substantially in the X direction ("airplane mode"). In the second configuration depicted in FIG. 2, wings 42 and 46 enable a lifting thrust to be provided to aircraft 10. Though not depicted in FIGS. 1-2, propulsion systems 50 and 54 can be controllably positioned in helicopter mode, airplane mode, or any position between helicopter mode and airplane mode to provide for a desired direction, thrust, and/or lift. It should be appreciated that aircraft 10 is merely illustrative of a variety of aircraft that can implement the apparatuses and methods disclosed herein. Other aircraft implementations can include hybrid aircraft, tiltrotor aircraft, unmanned aircraft, gyrocopters, and a variety of helicopter configurations, to name a few examples. Further, the apparatuses and methods disclosed herein can be implemented to design and manufacture an airfoil member for a variety of aircraft structural implementations, such as aircraft propellers, wings, and tail rotor blades, for example. Even further, the apparatuses and methods disclosed herein can be implemented to design and manufacture tailored support networks in non-aircraft implementations, such as space structures, watercraft structures, underwater structures, general transportation vehicle structures, sporting structures, and wind turbine structures, for example.

Figure 3A:
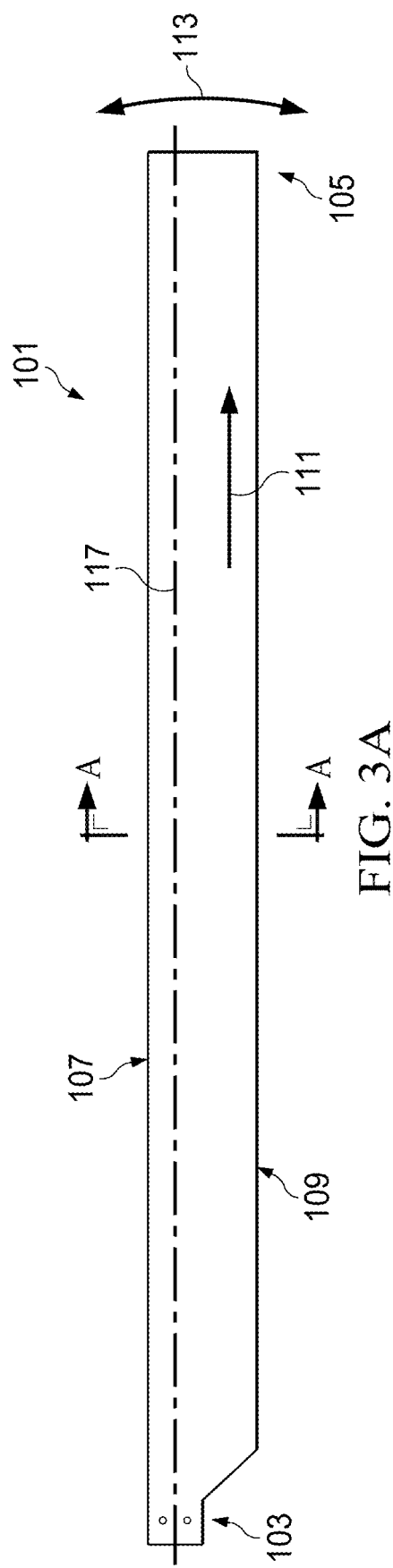
FIG. 3A is a top view of a rotor blade, according to one example embodiment.

Referring now to FIG. 3A, rotor blade 101 is an example of an airfoil member that can be configured with a support network to efficiently provide strength and stiffness. Rotor blade 101 has a root end 103 and a tip end 105, which define a lengthwise axis therebetween. Rotor blade 101 also has a leading edge 107 and a trailing edge 109, which define a chordwise axis 108, shown in FIG. 4, therebetween.

Referring to FIGS. 3A and 4, rotor blade 101 can include an upper skin 119, a lower skin 121, support network 123, and an abrasion resistant portion 125. Upper skin 119 and lower skin 121 can have varying thicknesses which are implementation specific. In the illustrated embodiment, upper skin 119 and lower skin 121 are "structural skins" in that they function together with support network 123 and abrasion resistant portion 125 as a structural assembly. In one embodiment, rotor blade 101 is constructed of an upper skin 119, lower skin 121, and support network 123 formed as onepiece using additive manufacturing processes. In other embodiments, at least one of the upper skin 119 and lower skin 121 are made of one piece with the support network 123. In another embodiment, the upper skin 119 and the lower skin 121 are made of one piece and the support network 123 is made of one piece, which can be bonded together to form the rotor blade 101. In another embodiment, each of the upper skin 119, the lower skin 121, and the support network 123 are made of one piece and bonded together to form the rotor blade 101. In still another embodiment, the abrasion resistant portion 125 can be constructed of a metallic material adhered to at least one of additively manufactured upper and lower skins 119, 121. In yet an embodiment, the upper and lower skins 119, 121 can constructed of a composite material and the support network 123 is additively manufactured as the support structure therefor.

During operation, rotor blade 101 is subjected to a variety of loads to which the rotor blade design must accommodate. For example, rotor blade 101 of rotorcraft 10 can generate centrifugal forces (schematically illustrated with direction arrow 111), in-plane loads such as lead/lag loads (schematically illustrated with direction arrow 113), out-of-plane loads such flapping loads (schematically illustrated with direction arrow 115 in FIG. 1), and torsional loads of rotor blade 101 such as a twisting about pitch change axis 117. It should be appreciated that even though axis 117 is illustrated as a pitch change axis, axis 117 can broadly be a spanwise axis. Conventionally, the aforementioned dynamic loading causes stress and strains that are primarily reacted by a conventional spar (such as a D-shaped spar) in a conventional rotor blade. At least one of the upper skin 119, lower skin 121, the support network 123, and components therefor, as discussed further herein, can be tailored to react to the dynamic loading by varying one or more physical or material characteristics as a function of chordwise location, lengthwise location, and out-of-plane location. In an embodiment, rotor blade 101 can be uniquely configured such that a spar can be eliminated because the support network 123 is tailored to react to the dynamic loading in conjunction with the upper and lower skin members 119, 121, as discussed further herein. It should be appreciated that rotor blade 101 can be configured in a variety of shapes and sizes as an airfoil member. For example, one embodiment of rotor blade 101 can include a certain amount of built in twist.

In an embodiment, support network 123 is uniquely tailored to have the local and global properties requisite to withstand the loading experienced by rotor blade 101 during operation. In contrast, conventional rotor blades may have core for stiffening one or more portions of a rotor blade, but the core is homogenous and lacking of tailoring. Therefore, a conventional spar is typically required to provide structural integrity to the conventional rotor blade. Support network 123 can be manufactured as having a plurality of interconnected support members 123s in various arrangements as described herein by a Solid Freeform Fabrication (SFF) method. In some embodiments, at least one of the upper skin 119, the lower skin 121, the support member 123, and components therefor can be manufactured by a SFF method.

SFF includes a group of emerging technologies that have revolutionized product development and manufacturing. The common feature shared by these technologies is the ability to produce freeform, complex geometry components directly from a computer generated model. SFF processes generally rely on the concept of layerwise material addition in selected regions. A computer generated virtual model serves as the basis for making a real model. The virtual model is mathematically sliced and each slice is recreated in the material of choice to build a complete object. A typical SFF machine can be likened to a miniaturized "manufacturing plant" representing the convergence of mechanical, chemical, electrical, materials and computer engineering sciences.

Various of the embodiments described herein include advancements and improvements in or related to the use of SFF and Rapid Prototyping (RP) or "additive" manufacturing processes, including Selective Laser Sintering (SLS), Direct Metal Laser Sintering (DMLS), Electron Beam Melting (EBM) and Selective Laser Melting (SLM) techniques, in the design, selection, development, manufacturing and/or repairing of rotor blades and rotor blade components.

While SFF can be used to manufacture a wide variety of object shapes, there are a host of perceived disadvantages and/or limitations associated with various of these techniques that have served to limit their widespread adoption. In the case of such additive manufacturing, these disadvantages can include rotor blade components and/or tools that (1) can be limited in the range of potential materials, (2) can lack sufficient quality for aerospace components such as having a rough surface finish or porous internal structure, (3) can experience high temperature gradients that can result in a build-up of thermal stresses, (4) can experience a relatively large shrink rate that can cause the part (or portions thereof) to warp, bow or curl, (5) can undergo a rapid solidification, often leading to the occurrence of segregation phenomena and the presence of non-equilibrium phases, (6) can have a surface feature detail that is relatively coarse, and the object can have a surface roughness created by the layer-wise building techniques (e.g., the "staircase effect"), (7) are to some extent dependent upon the stability, dimensions and behavior of the particle "melt pool," which can determine to a great extent the porosity and surface roughness, and (8) can require specialized and relatively expensive equipment (e.g., the laser printing machinery and specially processed raw materials) for manufacture, as well as highly trained operators.

Various embodiments, and the various SFF manufacturing techniques described herein, including SLS, DMLS, EBM or SLM manufacturing, may be utilized to create a tailored support network 123 having an arrangement with complex geometries and densities. In some embodiments, the various SFF manufacturing techniques described herein, including SLS, DMLS, EBM, or SLM manufacturing, may be utilized to create at least one of a tailored upper skin 119, lower skin 121, and support network 123. Various technologies appropriate for manufacturing rotor blades and components therefor are known in the art, for example, as described in *Wohlers Report* 2009, *State of the Industry Annual Worldwide Progress Report on Additive Manufacturing*, Wohlers Associates, 2009 (ISBN 0-9754429-5-3), available from the web www.wohlersassociates.com; Pham and Dimov, *Rapid manufacturing*, Springer-Verlag, 2001 (ISBN 1-85233-360-X); Grenda, *Printing the Future, The 3D Printing and Rapid Prototyping Source Book*, Castle Island Co., 2009; Liou, *Rapid Prototyping and Engineering Applications: A Toolbox for Prototype Development*, CRC, Sep. 26, 2007 (ISBN: 10: 0849334098; 13: 978-0849334092); *Advanced Manufacturing Technology for Medical Applications: Reverse Engineering, Software Conversion and Rapid Prototyping*, Gibson (Ed.), Wiley, January 2006 (ISBN: 10: 0470016884; 13: 978-0470016886); and Branner et al., "Coupled Field Simulation in Additive Layer Manufacturing," 3rd International Conference PMI, 2008.

Exemplary methods for forming rotor blades and/or rotor blade components

| Technique | Brief description of technique and related notes |
|---|---|
| CNC | CNC refers to subtractive manufacturing, which can be computer numerically controlled (CNC) machine tools, a computer driven technique, e.g., computer-code instructions, in which machine tools are driven by one or more computers. |
| Binder Jetting | Binder Jetting refers to an additive manufacturing technology. Binder Jetting uses layers of powder and a binder deposited onto the powder as opposed to heat. |
| Rapid prototyping | Rapid prototyping refers generally to automated construction of prototype or product using an additive manufacturing technology such as EBM, SLS, SLM, SLA, DMLS, 3DP, FDM, and other technologies. |
| EBM ® | EBM ® refers to electron beam melting, which is a powder-based additive manufacturing technology. Typically, successive layers of metal powder are deposited and melted with an electron beam in a vacuum. |
| SLS | SLS refers to selective laser sintering which is a powder-based additive manufacturing technology. Typically, successive layers of a powder (e.g., polymer, metal, sand, or other material) are deposited and melted with a scanning laser, for example a carbon dioxide laser. |
| SLM | SLM refers to selective laser melting, which is an additive manufacturing technology similar to SLS; however, with SLM the powder material is fully melted to form a fully dense product. |
| SLA or SL | SLA or SL refer to stereolithography, which is a liquid-based additive manufacturing technology. Typically, successive layers of a liquid resin are exposed to a curing, for example, UV laser light, to solidify each layer and bond it to the layer below. This technology typically requires the addition and removal of support structures when creating particular geometries. |
| DMLS | DMLS refers to direct metal laser sintering, which is a powder-based additive manufacturing technology. Typically, metal powder is deposited and melted locally using a fiber optic laser. Complex and highly accurate geometries can be produced with this technology. This technology supports net-shaping, which means that the product generated from the technology requires little or no subsequent surface finishing. |
| LC | LC refers to LaserCusing ®(LC), which is a powder-based additive manufacturing technology. LC is similar to DMLS; however, with LC a high-energy laser is used to completely melt the powder, thereby creating a fully-dense product. |
| 3DP | 3DP refers to three-dimensional printing (3DP), which is a high-speed additive manufacturing technology that can deposit various types of materials in powder, liquid, or granular form in a printer like fashion. Deposited layers can be cured layer by layer or, alternatively for granular deposition, an intervening adhesive step can be used to secure layered granules together in a bed of granules, which can be used to form multiple layers subsequently cured together, for example, with laser or light curing. |
| LENS | LENS ® refers to Laser Engineered Net Shaping™, which is a powder-based additive manufacturing technology. Typically, metal powder is supplied to the focus of the laser beam at deposition head. The laser beam melts the powder as it is applied, in raster fashion. The process continues layer by layer and requires no subsequent curing. This technology supports net-shaping, which means that the product generated from the technology requires little or no subsequent surface finishing. |
| FDM | FDM refers to fused deposition modeling™ (FDM) is an extrusion-based additive manufacturing technology. Typically, beads of heated extruded polymers are deposited row by row and layer by layer. The beads harden as the extruded polymer cools. |

A rotor blade including at least one of a tailored upper skin 119, lower skin 121, and support network 123 can be produced using additive manufacturing processes to create rotor blade and/or components therefor from an electronic or computerized data file (e.g., a CAD file). Additive manufacturing processes such as SLS, EBM, SLM, DMLS can allow the creation of durable rotor blades and components therefor.

In certain embodiments, a rotor blade can include at least one of a tailored upper skin 119, lower skin 121, and support network 123 produced via various additive manufacturing processes. For example, in certain embodiments, the upper skin 119 can be produced by SLM; the lower skin 121 can be produced by EBM; and the support network 123 can be produced by DMLS.

Figure 3C:
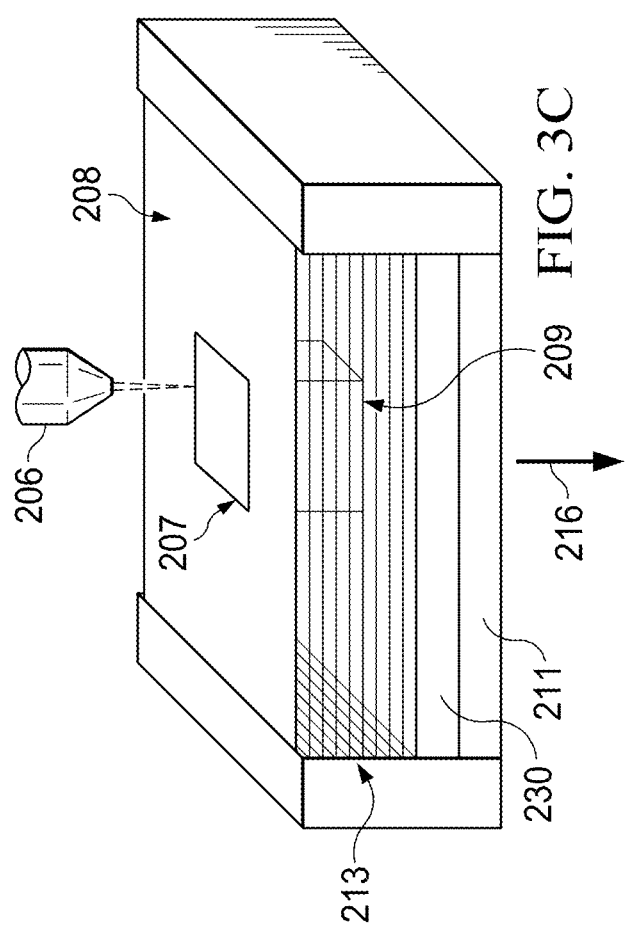
FIG. 3C is a schematic view of equipment and the process used in a typical SLM manufacturing process, according to an illustrative embodiment.
Figure 3B:
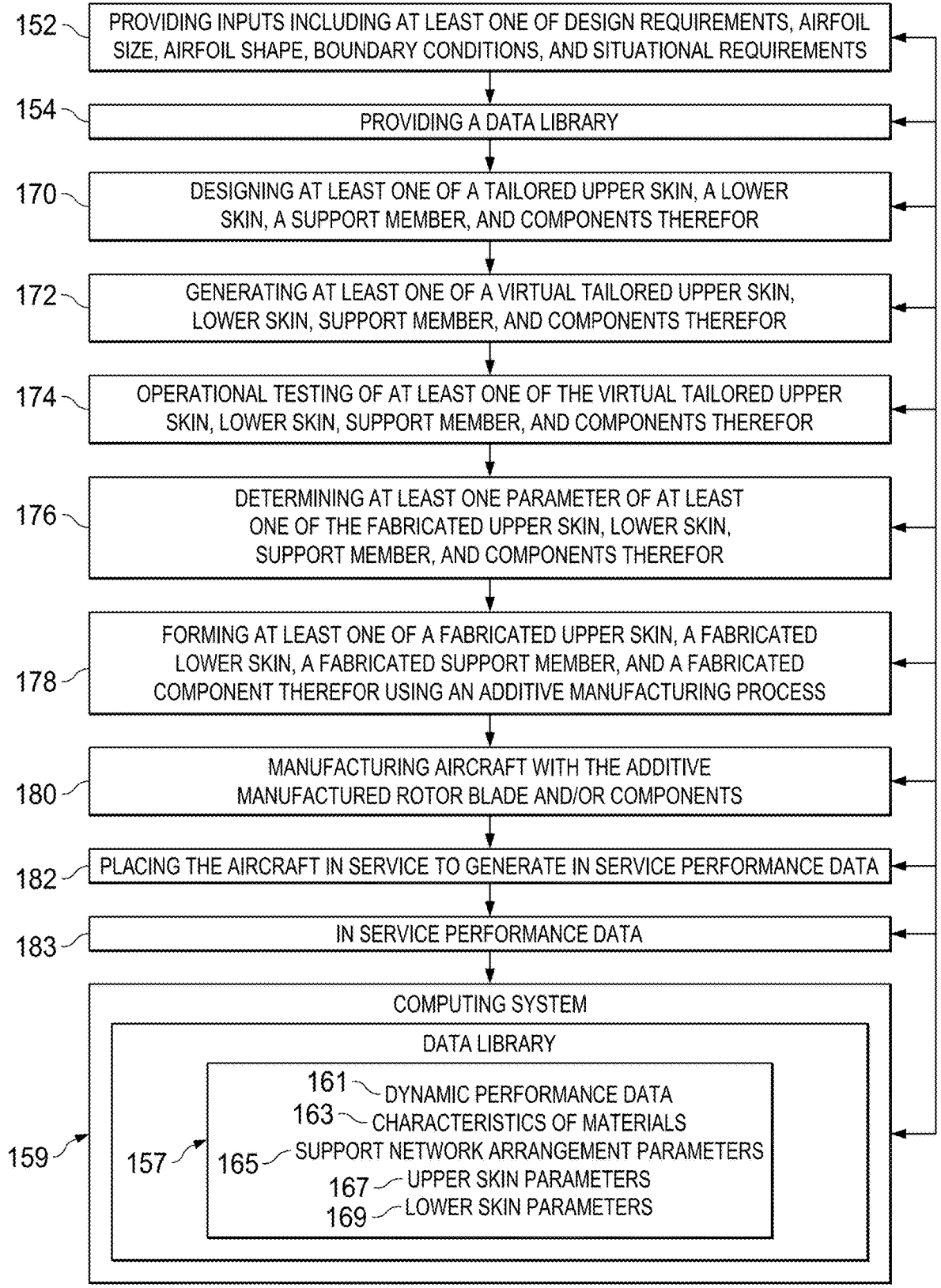
FIG. 3B is a flowchart illustrating a method of manufacturing a rotor blade, according to an illustrative embodiment.

Referring now to FIG. 3B, a method of making a rotor blade 150, can include designing a rotor blade including modifying a tailored design of at least one of the upper skin 119, the lower skin 121, the support network 123, and components therefor to accommodate the advantages and/or limitations of a specific manufacturing process, such as DMLS or SLM, which may result in different tailored designs for a specific rotor blade based on differing manufacturing methods. The various tailored designs, which can (but not necessarily must) have varying degrees of impact on the ultimate performance and operational life of the part, can be incorporated to accommodate a wide variety of considerations, including tolerancing and dimensioning limitations of specific manufacturing methodologies and/or equipment, design limitations, and/or design features orientation and/or shape requirements.

In one embodiment, the method 150 can include the step 152 of providing inputs including at least one of design requirements, airfoil size, airfoil shape, boundary conditions (e.g., velocity, rotor disk area attaining a determined lift; blade span and chord; blade twist; expected loads; chord, beam, and torsional stiffness; weight; center of gravity; blade fatigue life"), and situational requirements (e.g., maintaining structural blade integrity during a bird strike, erosion protection, lightning strike protection, ballistics, radar, and infrared signature).

Method 150 includes step 154 of providing a data library 157, which can contain information for use by a computing system 159 to create tailored and/or custom designed rotor blade 101 and/or components therefor. The data library 157 can include at least one of the following: dynamic performance data 161, characteristics of materials 163, support network arrangement parameters 165, upper skin parameters 167, and lower skin parameters 169. The dynamic performance data 161 can include information relating to constraints, complex loading, fatigue loading with life analysis, flaw growth analysis, and in service performance data from rotor blades manufactured according to method 150. In an embodiment, dynamic performance data 161 can include data of airfoil size, airfoil shape, and boundary condition (e.g., velocity, rotor disk area attaining a determined lift; blade span and chord; blade twist; expected loads; chord, beam, and torsional stiffness; weight; center of gravity; blade fatigue life) performance. In yet another embodiment, dynamic performance data 161 can include situational data (e.g., maintaining structural blade integrity during a bird strike, erosion protection, lightning strike protection, ballistics, radar, and infrared signature). The characteristics of materials 163 can include material properties (loading, etc.), particle size and characteristics, material blend gradient (multi-material machines), and functional gradients for tailored flapping/twist/or stiffness. The support network arrangement parameters 165 can include minimal particle size, support member arrangement (e.g., height, width, thickness), contours, shapes for the arrangement (e.g., lattice, reticulated, and others), cell concentration. The upper skin parameters 167 can include skin thickness, width, interior surface contour, and exterior surface contour. The lower skin parameters 169 can include thickness, width, interior surface contour, and exterior surface contour.

Method 150 includes step 170 of designing at least one of a tailored upper skin, a lower skin, a support network, and components therefor based, at least in part, on the inputs in step 152 and the information in the data library 154. The designing step 170 can include retrieving information from the data library 157 wherein a user of the computing system 159 or various other systems may selectably identify and retrieve the information in the data library 157 for further processing. The designing step 170 can include modifying the tailored upper skin, lower skin, support network, and components therefor for a particular three-dimensional printing technology as described herein. In an embodiment, the designing step 170 can include selecting an arrangement of the support network 123 that can include a lattice arrangement, reticulated arrangement, combinations of lattice and reticulated arrangements, and/or other arrangements. In an embodiment, the designing step 170 can including selecting an optimized arrangement of a support network 123 by a user or various other computer systems based on inputs provided by the user in step 152. The designing step can further include selecting the density and number of support members 123s in the arrangement of the support network 123 in a chordwise direction, lengthwise direction, and out-of-plane direction. In an embodiment, the designing step can include selecting a portion of the support network 123 to modify the arrangement, density, and number of support members 123s in at least one of the following orientations: chordwise direction, lengthwise direction, and out-of-plane direction.

Method 150 includes step 172 of generating at least one of a virtual tailored upper skin, lower skin, support network, and components therefor. In an embodiment, the virtual tailored member and/or component can be a three-dimensional computer model (e.g., CAD).

Method 150 includes step 174 of operational testing of at least one of the virtual tailored upper skin, lower skin, support network, and components therefor. In an embodiment, step 174 can include performing a finite element analysis, two dimensional section property analysis, three dimensional property analysis, bird strike analysis, ballistic analysis, and erosion analysis of at least one of the tailored upper skin, lower skin, support network, and components therefor.

Method 150 can include step 176 of determining, based, at least in part, on the operational testing of the virtual tailored upper skin, lower skin, support network and components therefor at least one parameter of at least one of the fabricated tailored upper skin, lower skin, support network and components therefor.

Method 150 can include step 178 of forming, based, at least in part, on the virtual tailored upper skin, lower skin, support network, and components therefor at least one of a fabricated upper skin 119, a fabricated lower skin 121, a fabricated support network 123, and a fabricated component therefor using an additive manufacturing process. The additive manufacturing process can include at least one of the following: electron beam melting, selective laser sintering, selective laser melting (SLM), stereolithography, direct metal laser sintering, three-dimensional printing, fused deposition modeling, laser curing and lasered engineered net shaping. In an embodiment, the forming step 178 can include using a plurality of additive manufacturing processes (e.g., a series of additive manufacturing processes). In an example, a fabricated support network 123 can be formed from SLM, then a lower skin 121 can be formed by stereolithography. In yet another example, forming step 178 can include using a plurality of additive manufacturing processes to manufacture one component (e.g., upper skin 119, lower skin 121, support network 123). For example, a first portion of the support network 123 can be formed by SLM, and a second portion of the support network 123 can be formed by stereolithography and combined with adhesive or using other manufacturing techniques, including an additive manufacturing process.

FIG. 3C depicts a schematic view of equipment and the process used in a typical SLM manufacturing process. SLM is a powder bed 208 process that begins with the deposition of a thin layer of powder onto a substrate 230, which can be disposed on a processing table 211. A high power laser 206 scans the surface of the powder, generating heat that causes the powder particles to melt (see melted powder 207) and form a melt pool which solidifies as a consolidated layer of material. Once the layer has been scanned and relevant portions melted/solidified, another layer of powder is deposited, which is then subsequently scanned and melted/solidified to form the next layer of the part. This process continues with multiple layers 213 until enough layers of material have been deposited/melted/solidified to create a desired object 209. Powder particles that are not melted remain loose and are removed 216 (and can typically be reused) once the component is complete.

Method 150 can include the step 180 of manufacturing an aircraft with the additively manufactured rotor blade and/or components and the step 182 of placing the aircraft in service to generate in service performance data 183. The in service performance data can be added to the data library 157 and can include repair and maintenance information. In an embodiment, in service performance data of at least one of a fabricated rotor blade, a fabricated upper skin, a fabricated lower skin, a fabricated support network, and components therefor is stored in the dynamic performance data 161.

Unlike traditional manufacturing methods of rotor blades, additive manufacturing processes provide an exceptional level of design and manufacturing access to the internal structure(s) of a manufactured part. Because additive manufacturing provides a significant level of control or "tailoring" of the micro and macroscopic internal and external structures of manufactured objects, the techniques of laser track scanning and melt pool layering can be particularly useful in the manufacture of rotor blade and/or components. In various embodiments, the support network 123 can be tailored to include a variety of internal and external structures, which can be formed in a single manufacturing operation, if desired. For example, support network 123 shown in FIG. 4 can be formed using additive manufacturing processes to achieve a lattice arrangement having a generally uniform density of support members 123s. In other embodiments, depending upon the design of rotor blade, various portions of the support network 123 may have a different density (e.g., increased or decreased density of cells and/or support networks) in a chordwise direction, lengthwise direction, and/or out-of-plane direction, as shown in FIGS. 5-6 and 10-14.

The use of rapid prototyping techniques to fabricate a rotor blade and components therefor is advantageous because it provides the ability to modify internal structural and external features of the rotor blade in a desired manner while retaining a smooth, continuous exterior surface. The present disclosure provides a designer with the ability to provide a high level of mechanical support from the support member 123 for the upper and lower skins 119, 121, as well as rapid and easy design and manufacture thereof.

Support network 123 can be tailored by the arrangement of the support members 123 (e.g., shape, size, material, density). In an embodiment, as shown in FIG. 4, support network 123 has a lattice arrangement with uniform support members 123s and a generally uniform density; however, the exact, size, shape and material of support network is implementation specific. Further, support network 123 is illustrated in a lattice arrangement having support members 123s that define openings 123o having square and triangle shapes; however, the disclosure herein is not limited to a lattice arrangement having square and triangle shaped openings, rather other shaped openings, for example, but not limitation, rectangle, pentagon, octagon, trapezoid, and non-geometric organic shapes etc., can also be implemented. The size of each support member 123s can be tailored (e.g., length, width, depth, outer diameter, etc.). In the exemplary embodiment, the width of the support members 123s is uniform, while the length of the support members 123s is varied. In some embodiments, the length of the support members 123s may vary gradually or in discrete portions in a chordwise direction as shown in FIG. 4. In some embodiments, the support members 123s can be wider and/or have a varied outer diameter; for example, but not limitation, in areas where it is desirable to address in flight stresses and strains the outer diameter of the support member 123s can be larger than in areas with less stress and strains.

In some embodiments, at least a portion of the support network 123 can be comprised of hollow support members 123s. In an embodiment, the support network 123 is a plurality of hollow support members 123s.

Support member 123 can be tailored by the choice of materials. Any material known in the art can be used for any of the support member and components therefor described in the foregoing embodiments, for example including, but not limited to metal, metal foil, metal film, metal wire, molten metal, metallic powders, metal alloys, combinations of metals, ceramics, plastic, polyethylene, cross-linked polyethylene's or polymers or plastics, pyrolytic carbon, nanotubes and carbons, short fiber reinforced composites, long and/or continuous fiber reinforced composites, plant derived composites, recycled composites, nanotube infused resin, microtube infused composites, as well as metal matrix composite materials.

In an exemplary embodiment, the SLM raw material can comprise a CrCO powder having an average particle size of between about 34 to about 54 microns, although larger and/or smaller particles may be used with varying degrees of utility (as well as the use of differing size particles in creating a single component). In various embodiments, the deposited particle layer may be about 60 microns thick which, when melted, consolidated and cooled, can create a solid structural layer of approximately 20 microns thickness.

The density of the support network 123 can be tailored. Density can mean the number of cells or holes per units of width. An exemplary support network 123 in FIG. 4 has a uniform density of about 21 cells along the chordwise axis 108 extending from the leading edge 107 to the trailing edge 109, which can be a density of about 0.7 cell per inch. The density can be increased such that there are more cells or holes per units of width as compared to other areas in the support network. For example, in an embodiment shown in FIG. 5, the support network 123' has a lattice arrangement with closely compacted portions 131 and open cell portions 133. The closely compacted portions 131 can be located within the support member 123s to increase strength/stiffness to accommodate in-plane, out-of-plane, and torsional loads.

In the embodiment shown in FIG. 5, there can be a plurality of closely compacted portions 131 adjacent to the leading edge 107. There can be a first closely compacted portion 131f adjacent to the leading edge 107 having a density greater (e.g., having about 4 cells per inch in the first leading edge portion, which can be the first one-fifth of the chordwise length of the rotor blade 101) than a second, third and fourth closely compacted portions 131s, 131t, 131r. The second closely compacted portion 131s can be located in an upper portion above the chordwise axis 108 (e.g., adjacent to the upper skin 119) and in a leading edge portion having a density less than the first closely compacted portion 131f (e.g., the second closely compacted portion has about 3 cells per inch). The third closely compacted portion 131*t* can be located in a lower portion below the chordwise axis 108 (e.g., adjacent to the lower skin 121) and in a leading edge portion having a density less than the first closely compacted portion 131*f* (e.g., the third closely compacted portion has about 3 cells per inch). The fourth closely compacted portion 131*r* can be disposed aft of the first closely compacted portion and can have a density less than the first, second, and third closely compacted portions (e.g., the fourth closely compacted portion 131*r* can have about 1 cell per inch). In an embodiment, the second and third closely compacted portions 131*s*, 131*t* are in out-of-plane configurations.

There can be a plurality of open cell portions 133 in the support network 123'. The first open cell portion 133*f* is adjacent to the trailing edge 109 and can have a density less than the second, third, and fourth open cell portions 133*s*, 133*t*, 133*r* (e.g. the first open cell portion 133*f* can have about 0.5 cells per inch). In an embodiment, the second open cell portion 133 can have about 0.7 cells per inch and can be disposed in a trailing edge portion of the rotor blade 101. The third open cell portion 133*t* can be disposed in an upper portion above the chordwise axis 108 (e.g., adjacent to the upper skin 119) and in a central portion of the rotor blade and having a density of about 0.8 cells per inch. The fourth open cell portion 133*r* can be disposed in a lower portion below the chordwise axis 108 (e.g., adjacent to the lower skin 121) and in a central portion of the rotor and having a density of about 0.8 cells per inch. In an embodiment, the third and fourth open cell portions 133*t*, 133*r* are in out-of-plane configurations. It should be appreciated that the closely compacted portions 131 and the open cell portions 133 of the support member 123' may take on a wide variety of configurations specific for an implementation. In an embodiment, the closely compacted portions 131 have a cell density more than the open cell portions 133.

In an embodiment, at least one of the upper and lower skins 119, 121 can be tailored in a chordwise direction and lengthwise direction. In an embodiment, at least a portion of the upper and lower skins 119, 121 has a thick profile. In an embodiment, the leading edge portion 119*f*, 121*f* of the upper and lower skins 119, 121 has a thick profile that is thicker than the profile of the trailing edge portion 119*a*, 121*a*, as shown in FIG. 4. In another embodiment, shown in FIG. 5, the upper and lower skins 119', 121' have a generally uniform thickness that can have a thin profile (e.g., thinner than a skin produced using conventional manufacturing methods). In an embodiment, the leading edge 107 can range in thickness from about 0.020 inches to about 0.50 inches from the exterior surface to the interior surface. In an exemplary embodiment, as shown in FIG. 4, the leading edge can have a thickness from about 0.050 to about 0.25 inches from the exterior surface to the interior surface. In another embodiment for a small scale unmanned aerial vehicle, the leading edge thickness can range from about 0.020 to about 0.10 inches from the exterior surface to the interior surface. In an embodiment, a full scale rotor blade can range from 0.050 inches to about 0.50 inches from the exterior surface to the interior surface. In yet another embodiment, as shown in FIG. 9, the leading edge 507 can be solid or be filled all the spar opening resulting in a thickness of up to 3 inches. In an embodiment, at least one of the upper and lower skins 119, 121 are constructed of a onepiece solid material (e.g., there are no fabric plies therein).

FIG. 6 is still another example of a rotor blade 301. Certain components of rotor blade 301 are as described above in connection with the rotor blade 101, except as noted herein. Those components bear similar reference characters to the components of the rotor blade 101, but with a leading '3' rather than a leading '1'. The support network 323 of rotor blade 301 has a reticulated arrangement. The support network 323 can include support members 323*s* that define openings 323*o* having generally a round shape. Support members 323*s* have a thick width to support the upper and lower skins 319, 321. Support network 323 includes a closely compacted portion 331 in a leading edge portion 323*f*. The closely compacted portion 331 includes a varied density of cells. In an exemplary embodiment, the closely compacted portion 331 can have a density of less than 1.2 cells per inch. The support network 323 can include an open cell portion 333 in a trailing edge portion 323*a*. The open cell portion 333 includes a varied density of cells. In an embodiment, the open cell portion 333 can have a density of 1.2 cells per inch or greater.

Figure 8A:
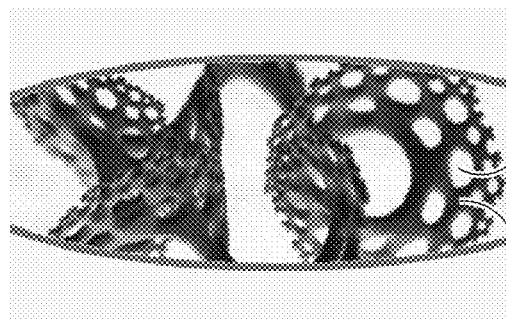
FIGS. 8A-8D are schematic views of support networks, according to illustrative embodiments.
Figure 8B:
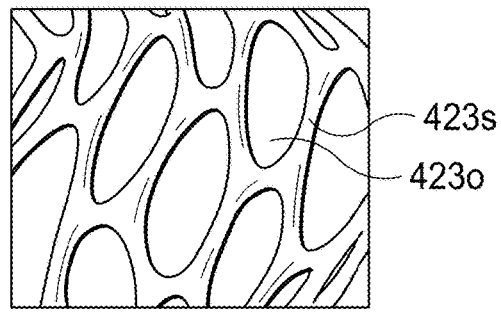
Figure 8C:
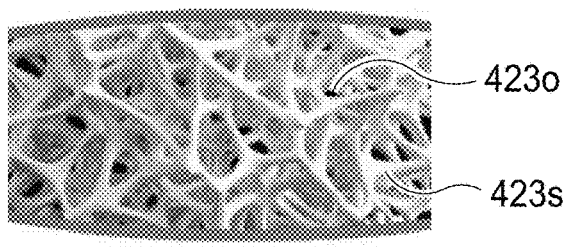
Figure 8D:
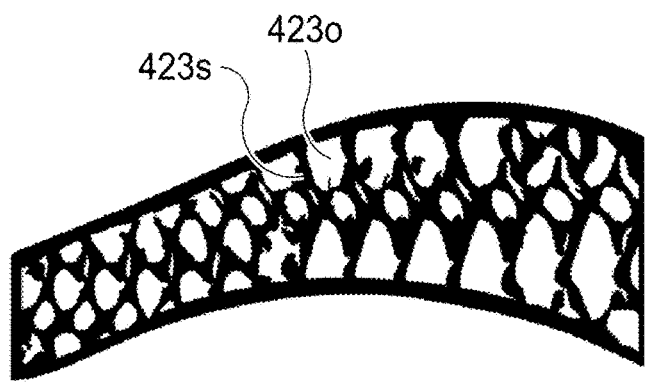

FIG. 7 is another example of a rotor blade 401. Certain components of rotor blade 401 are as described above in connection with the rotor blade 301, except as noted herein. Those components bear similar reference characters to the components of the rotor blade 301, but with a leading '4' rather than a leading '3'. The support network 423 of rotor blade 401 has a reticulated arrangement that is generally uniform in density. In the exemplary embodiment, support network 423 includes uniform honeycomb cells oriented generally horizontally. Support network 423 is comprised of interconnected and/or interwoven support members 423*s* that define openings 423*o* having an elongated, globular shape; however, the reticulated arrangement of the support members 423 is not limited thereto as other non-uniform, rounded or other biomimetic type shapes can be used. For example, support members 423 can have an arrangement as shown in FIGS. 8A-8D. In an exemplary embodiment, as shown in FIG. 8A, support member 423*s* can have uneven thicknesses that define openings 423*o* having varied rounded shapes. In exemplary embodiments, as shown in FIGS. 8B-8C, support members 423*s* can have a generally uniform thickness that defines openings 423*o* having varied elongated and rounded shapes. In another exemplary embodiment, as shown in FIG. 8D, support member 423*s* can have uneven thicknesses that define openings 423*o* having varied elongated and rounded shapes.

FIG. 9 is another example of a rotor blade 501. Certain components of rotor blade 501 are as described above in connection with the rotor blade 101, except as noted herein. Those components bear similar reference characters to the components of the rotor blade 101, but with a leading '5' rather than a leading '1'. Rotor blade 501 includes a support network 523 having support members 523*s* that define openings 523*o* having polygon and diamond type shapes. The upper and lower skins 519, 521 have a thick profile in a leading edge portion that defines a leading edge opening 535 along with support member 523*i*. Upper and lower skins 519, 521 include a dense leading edge portion 519*d*, 521*d* that in some embodiments can be solid.

FIG. 10 is another example of a rotor blade 601. Certain components of rotor blade 601 are as described above in connection with the rotor blade 401, except as noted herein. Those components bear similar reference characters to the components of the rotor blade 401, but with a leading '6' rather than a leading '4'. Rotor blade 601 includes a support network 623 having both lattice arrangement portions 637*a*, 637*b*, 637*c* and reticulated portions 639*a*, 639*b*. In an embodiment, as shown in FIG. 10, the lattice arrangement portions 637*a*, 637*b*, 637*c* are different lattice arrangements. In an embodiment, the reticulated portions 639*a*, 639*b* have similar reticulated arrangements but are disposed in different areas (e.g., a leading edge portion 601f and a trailing edge portion 601a, respectively). It should be appreciated that support member 623 can take on a wide variety of configurations (e.g., reticulated portions 639a, 639b can have varied arrangements and the lattice arrangement portions 637a, 637b, 637c can have similar lattice arrangements). In an embodiment, there are no seams between the lattice arrangement portions 637a, 637b, 637c and reticulated portions 639a, 639b. In an embodiment, rotor blade 601 is made of one piece.

Figure 11:
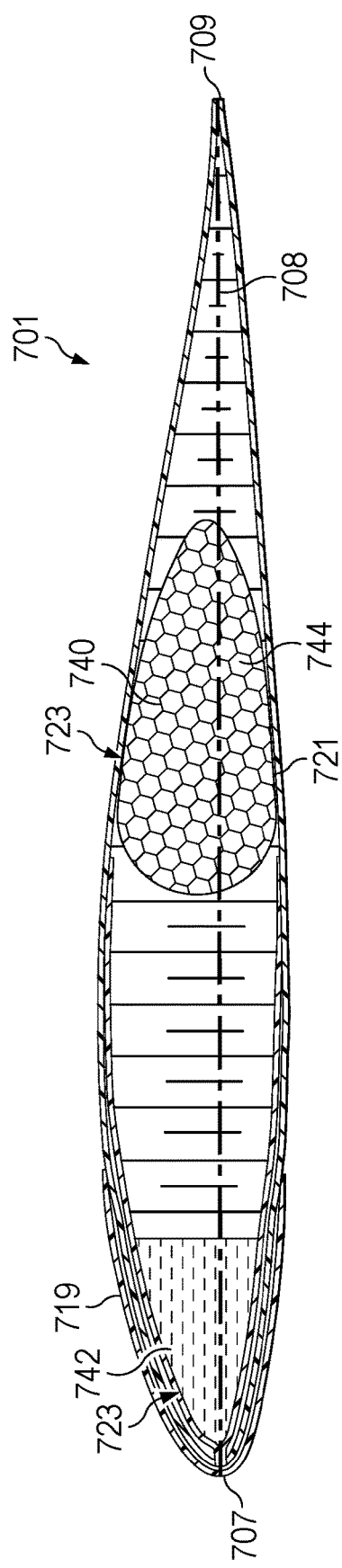
Figure 22:
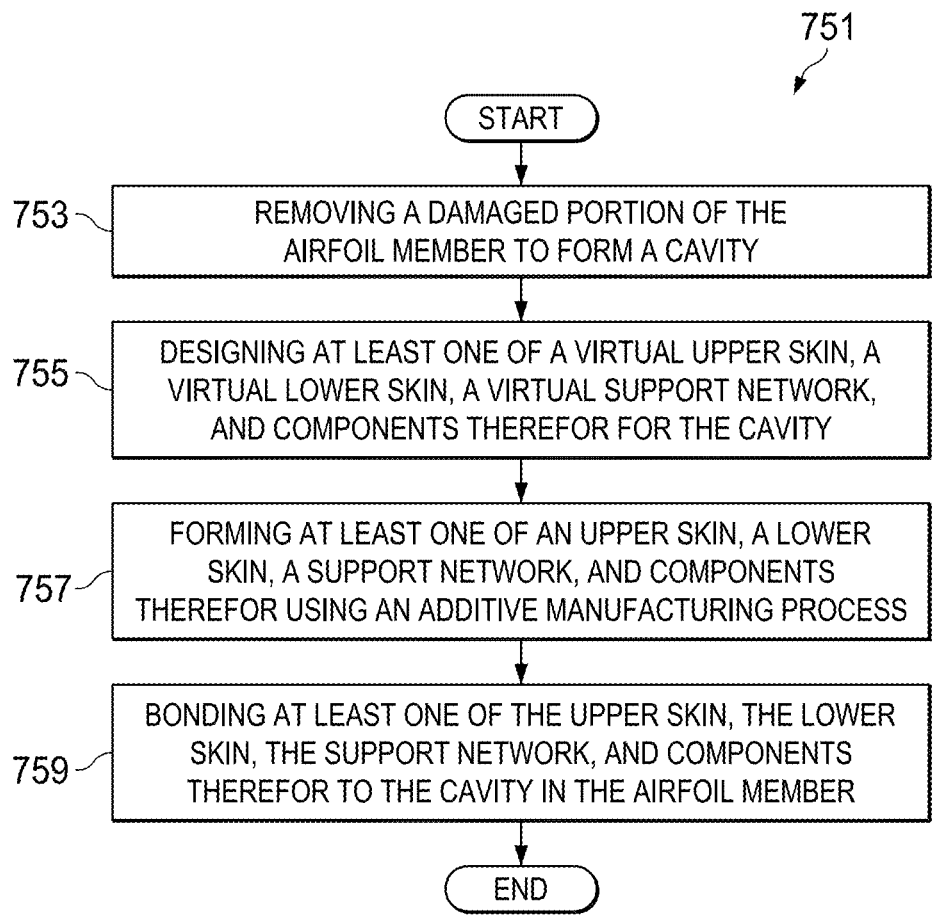
FIG. 22 is a flowchart illustrating a method of repairing a rotor blade, according to an illustrative embodiment.

FIG. 11 is another example of a rotor blade 701. Certain components of rotor blade 701 are as described above in connection with the rotor blade 101, except as noted herein. Those components bear similar reference characters to the components of the rotor blade 101, but with a leading '7' rather than a leading '1'. Rotor blade 701 can include a hex-shaped honeycomb core 740 manufactured from conventional methods using composite materials. Rotor blade 701 can include at least one support network 723 as described herein disposed within the honeycomb core 740. In an exemplary embodiment, the at least one support network 723 includes a first support network 742 disposed in a leading edge portion 707 and a second support network 744 disposed in a trailing edge portion 709. The first and second support networks 742, 744 can have any arrangement as described herein; in an exemplary embodiment, first network 742 is a lattice arrangement and second network 744 is a reticulated arrangement. In an embodiment, rotor blade 701 is a manufactured rotor blade such that first and second support networks 742, 744 are bonded to the honeycomb core 740 during assembly. Any bonding techniques and combinations thereof known in the art can be used for bonding the first and second support networks 742, 744 to the honeycomb core 740 and/or the upper and lower skins 719, 721, for example including, but not limited to adhesive, reticulated adhesive, paste bonding, thermosetting adhesives In an embodiment, the rotor blade 701 can be a damaged rotor blade that is repaired according to method 751, as shown in FIG. 22, include a step 753 of removing a damaged portion of the airfoil member to form a cavity. The cavity can be within the rotor blade or a portion of the rotor blade that has been removed (e.g., the leading edge, the trailing edge, the tip or a portion thereof, etc.). Method 751 includes a step 755 of designing at least one of a virtual upper skin, a virtual lower skin, a virtual support network, and components therefor for the cavity. Step 755 can include scanning or otherwise measuring the cavity in the damaged rotor blade to design a support network 723, an upper skin 719, and/or a lower skin 721. Step 755 can include designing the first and second support networks 742, 744 for placement into or onto the cavity and to accommodate the in-plane, out-of-plane, and torsional loads for the rotor blade 701. In an embodiment, after the designing step, the method 751 can include the step 757 of forming at least one of the upper skin, the lower skin, a support network, and components therefor using an additive manufacturing process. Method 751 further includes step 759 of bonding at least one of the upper skin, the lower skin, the support network, and components therefor to the cavity in the airfoil member. In an exemplary embodiment, as shown in FIG. 11, either of the first and second support networks 742, 744 can be fabricated using additive manufacturing processes as described herein and printed directly into and/or onto the damaged portion or location. In an exemplary embodiment, either of the first and second support networks 742, 744 can be bonded directly to the damaged portion by heating the material during the printing operation. In another embodiment, either of the first and second support networks 742, 744 can be bonded to the damaged portion or location using conventional adhesive bonding techniques. It will be appreciated that the exemplary embodiment of method 751 includes first and second support networks 742, 744; however, there can be more or less support networks and/or skin portions in other embodiments depending on the extent of the rotor blade damage.

Figure 23:
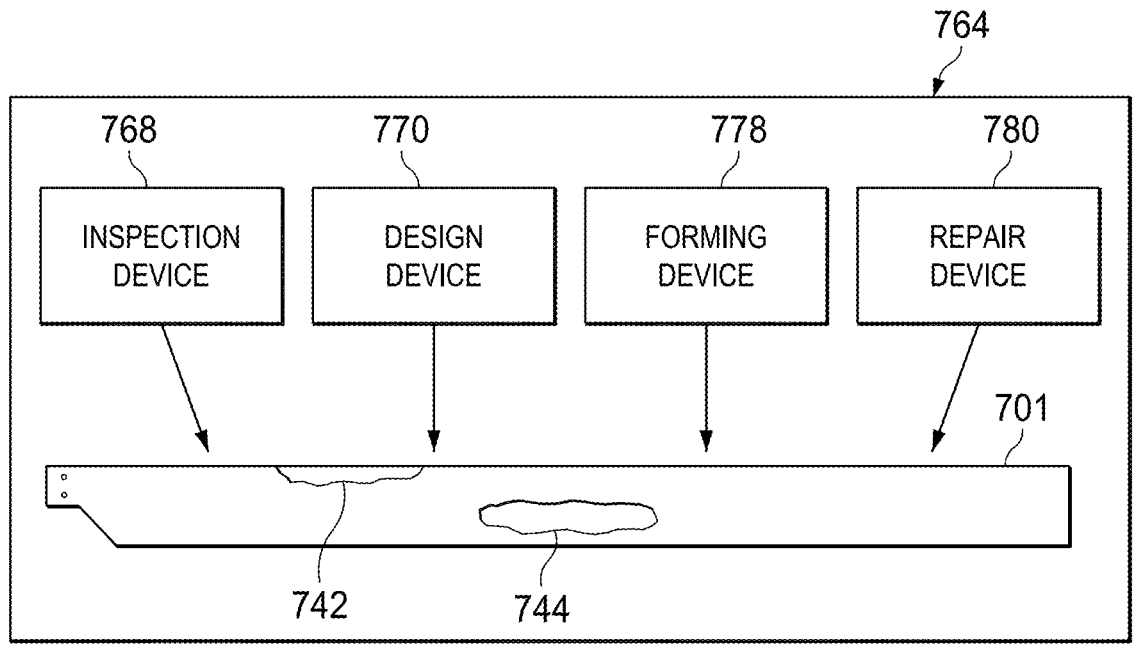
FIG. 23 is schematic illustration of a system for repairing a rotor blade, according to an exemplary embodiment.

In another embodiment, the method 751 can include non-invasive internal structure removal by a laser or other non-invasive removal tool (e.g., heating tool, ultrasonic tool, electromagnetic pulsing tool, or cutting tool) that can modify and/or rearranged the damaged portion without affecting at least one of the upper and lower skins 719, 720. In an embodiment, rotor blade 701 includes damaged portions that can be placed in or associated with system In still another embodiment, a repair system 764 is illustrated in FIG. 23. In an embodiment, the repair system 764 can include an inspection device 768, a design device 770, a forming device 778, and a repair device 780. In an embodiment, at least one of the devices 768, 770, 778, 780 can be controlled by a computer system connected of the repair system 764. In an exemplary embodiment, a repaired rotor blade 701 can be repaired in or is otherwise associated with repair system 764. The inspection device 768 can scan or otherwise measure the damaged portions, then the design device 770 can analyze the damaged portions to evaluate whether the damaged portions need to be removed to form cavity in the rotor blade 701 or whether the damaged portions can be remelted or otherwise reconfigured to form a reconfigured portion. If needed, the design device 768 can determine an optimized patch configuration for the cavity or reconfigured portion. If needed, the forming device 778 can generate a patch for the cavity or reconfigured portion. The repair device 780 can further assist in repairing the rotor blade 701 by bonding, trimming, and/or surface finishing the patch.

Figure 12:
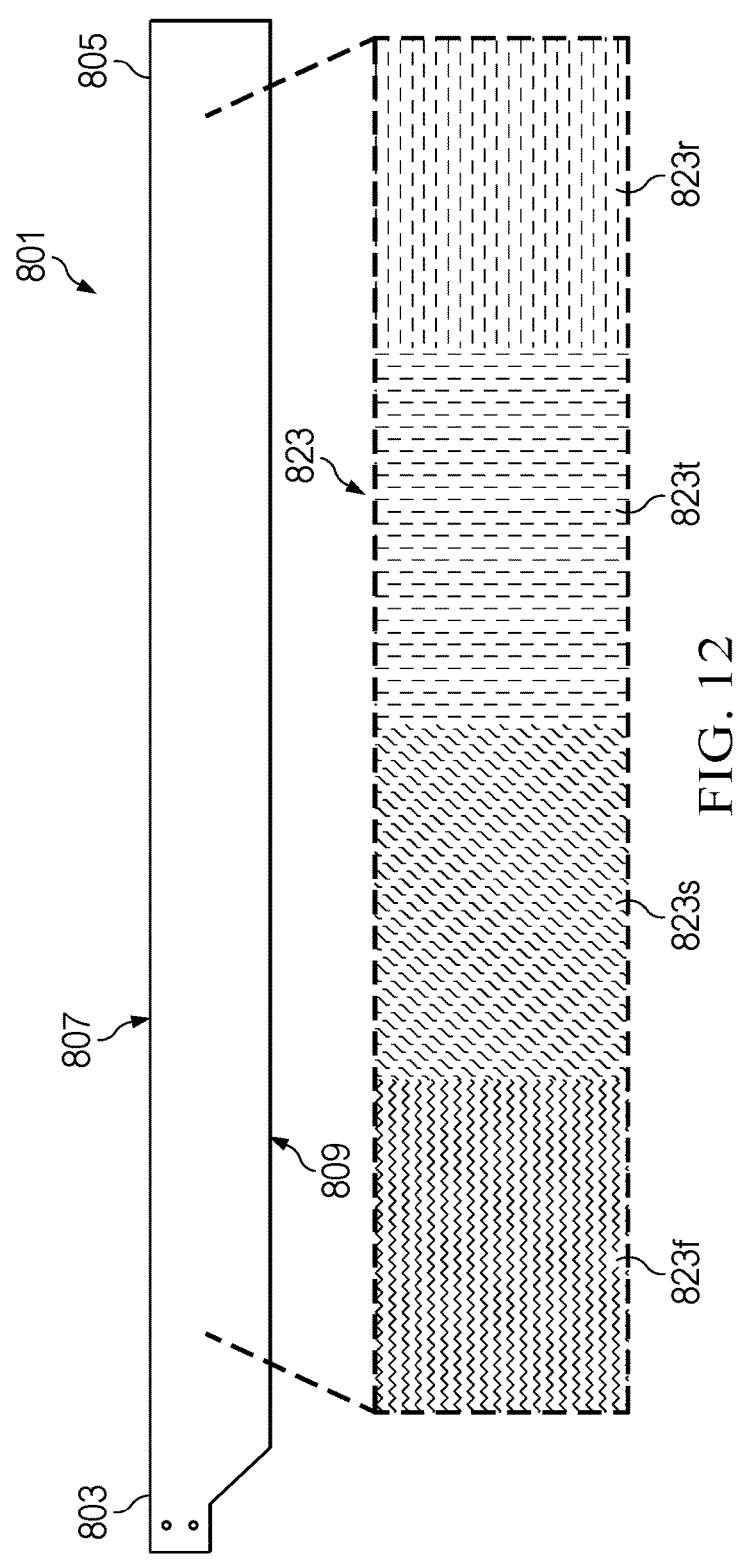
Figure 15:
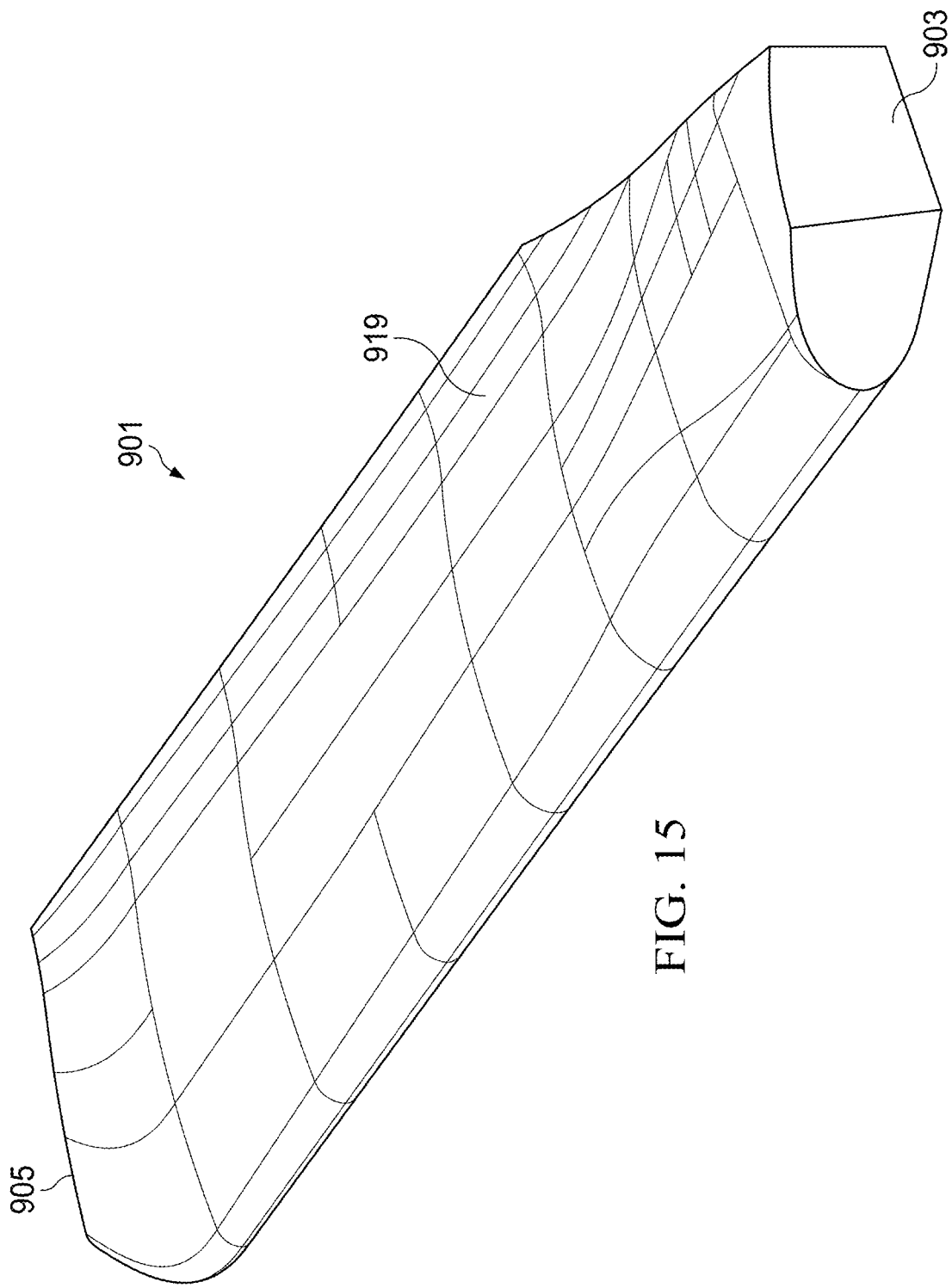
FIG. 15 is a perspective view of a tail rotor blade, according to an illustrative embodiment.
Figure 16:
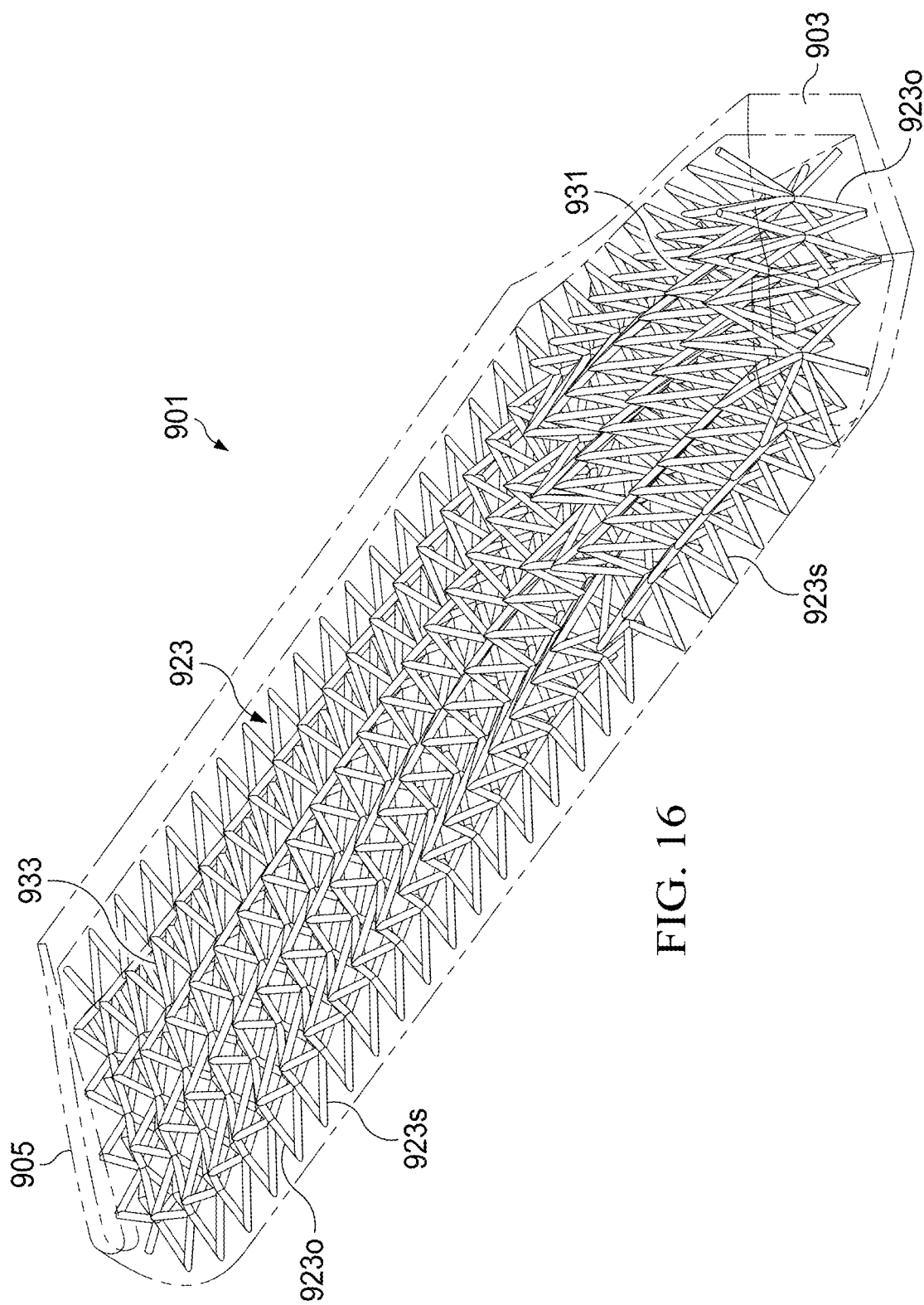
FIG. 16 is a perspective, detail view with the skins removed of a tail rotor blade, according to an illustrative embodiment.
Figure 17:
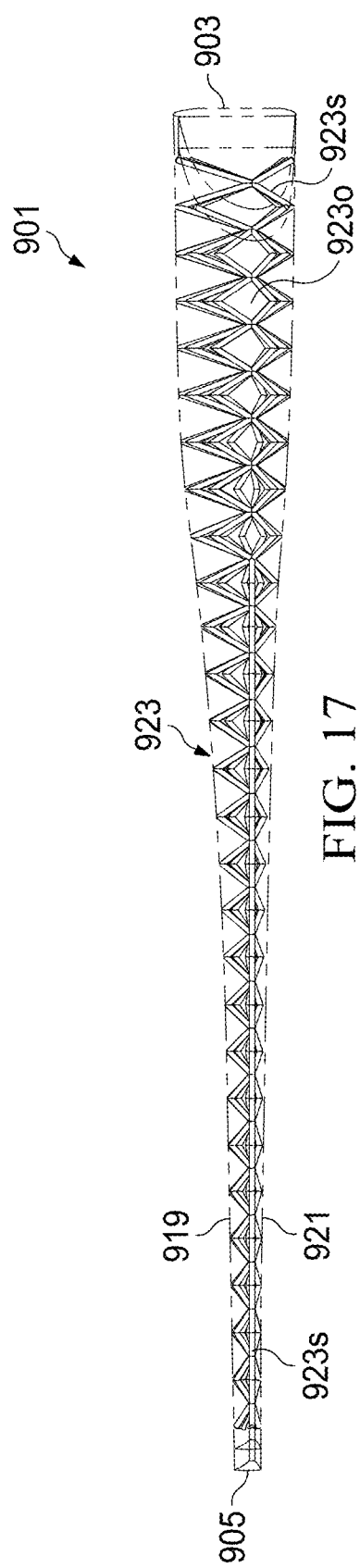
FIG. 17 is a side view with the skins removed of a tail rotor blade, according to an illustrative embodiment.
Figure 18:
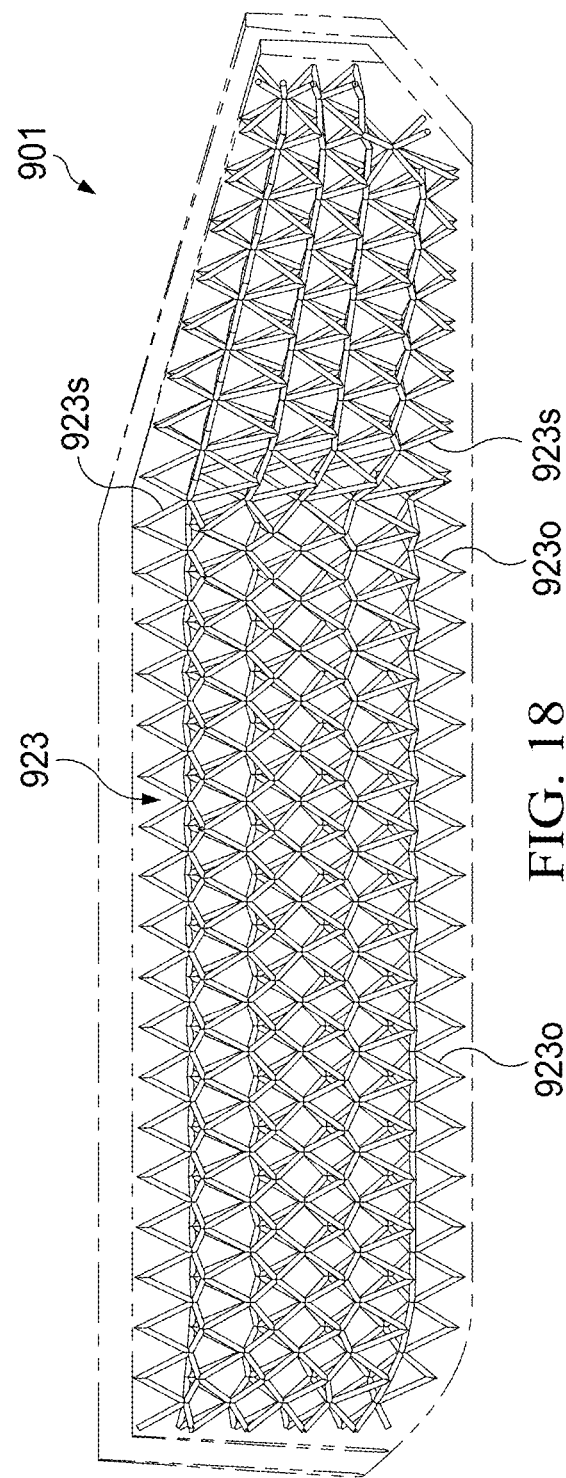
FIG. 18 is a top view with the skins removed of a tail rotor blade, according to an illustrative embodiment.
Figure 19:
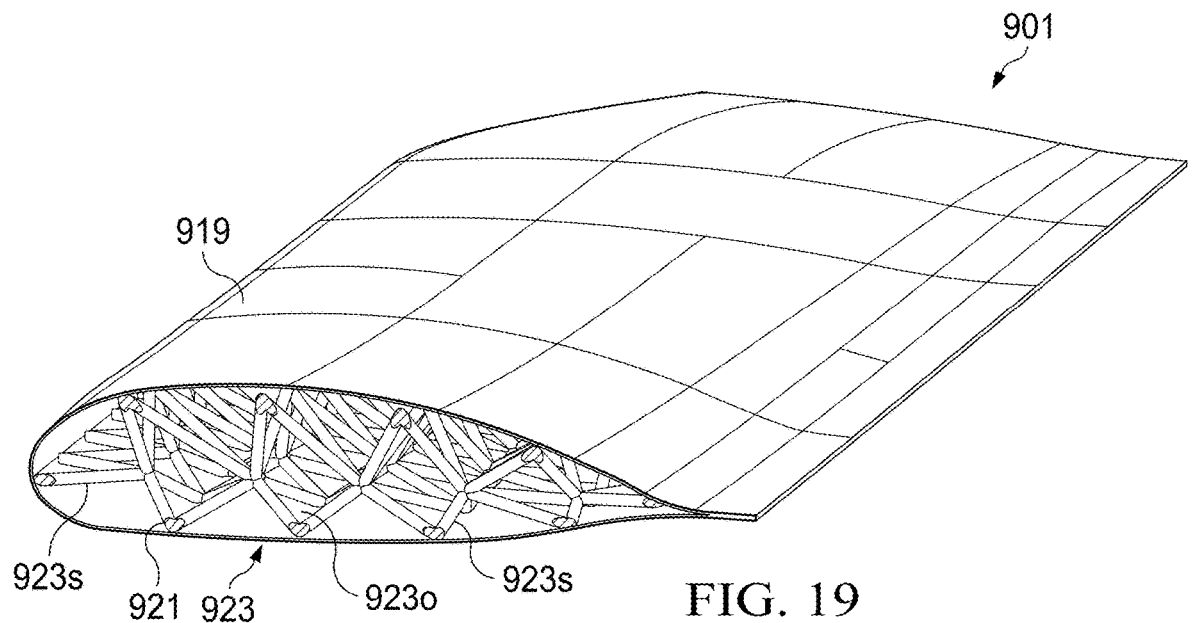
FIG. 19 is a partially removed perspective view of a tail rotor blade, according to an illustrative embodiment.

FIGS. 12-14 are examples of a rotor blade 801. Certain components of rotor blade 801 are as described above in connection with the rotor blade 101 and rotor blades described herein, except as noted herein. Those components bear similar reference characters to the components of the rotor blade 101, but with a leading '8' rather than a leading '1'. Rotor blade 801 has a leading edge 807 and a trailing edge 809. Rotor blade 801 includes a support network 823 having first, second, third, and fourth portions 823f, 823s, 823t, 823r disposed in a series in a spanwise orientation from root end 803 to tip end 805. Each of first, second, third, and fourth portions 823f, 823s, 823t, 823r of the support network 823 can each be different and tailored as described herein. As shown in FIG. 12, first, second, third, and fourth portions 823f, 823s, 823t, and 823r are each about the same spanwise width and have a uniform shape (e.g., generally square). In some embodiments, as shown in FIGS. 13-14, each of the first, second, third, and fourth portions 823f, 823s, 823t, and 823r are tailored to have different widths and different shapes (e.g., FIG. 13 the shape of each portion has linear edges and FIG. 14 the shape of the portions can have linear and curved edges). In an embodiment, support network 823 is made of one piece.

Referring now to FIGS. 15-20, a tail rotor blade 901 that is manufactured utilizing one or more methods and apparatuses described herein is illustrated. Tail rotor blade 901 includes an upper skin 919, a lower skin 921, and a support network 923. Support network 923 includes support members 923s in a lattice arrangement that define openings 923o having triangular and diamond shapes. Support network 923 can include closely compacted portion 931 adjacent to a root end 903 and an open cell portion 933 adjacent to tip end 905.

Figure 21:
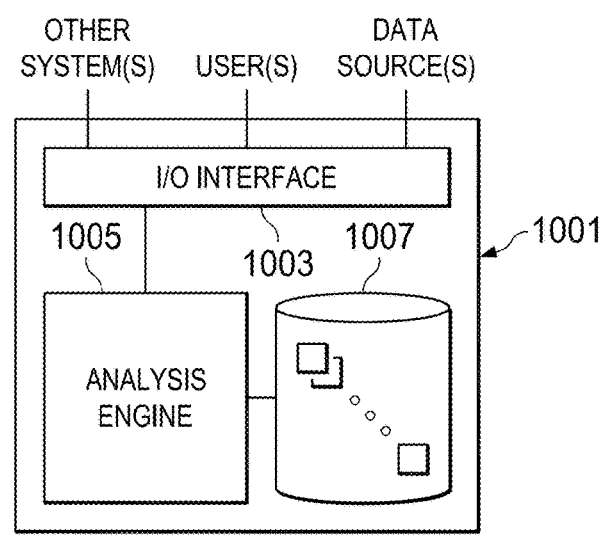
FIG. 21 is a schematic block diagram of a computer system, according to an illustrative embodiment of the present disclosure.
Figure 20:
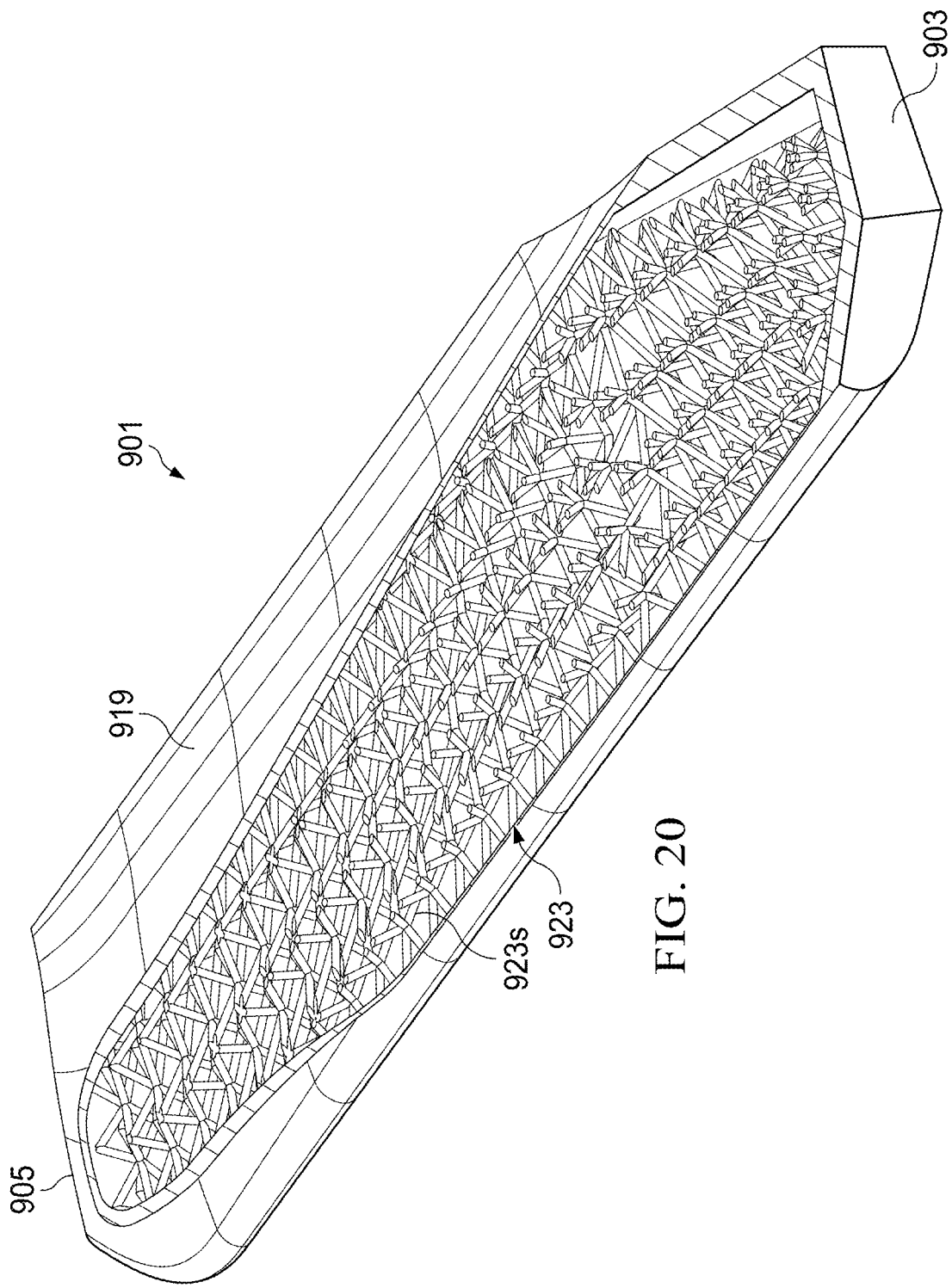
FIG. 20 is a partially removed perspective view of a tail rotor blade, according to an illustrative embodiment.

Referring now to FIG. 21, a computing or computer system 1001 is schematically illustrated. System 1001 is configured for performing one or more functions with regard to methods disclosed herein with regard to tailoring at least one of the upper skin, lower skin, support network, and components therefor for rotor blade 101, as well as other methods or processes described herein.

System 1001 can include an input/output (I/O) interface 1003, an analysis engine 1005, and a database 1007. Alternative embodiments can combine or distribute the input/output (I/O) interface 1003, analysis engine 1005, and database 1007, as desired.

Embodiments of system 1001 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1003 can provide a communication link between external users, systems, and data sources and components of the system 1001. The I/O interface 1003 can be configured for allowing one or more users to input information to the system 1001 via any known input device. Examples can include a keyboard, mouse, touch screen, and/or any other desired input device. The I/O interface 1003 can be configured for allowing one or more users to receive information output from the system 1001 via any known output device. Examples can include a display monitor, a printer, and/or any other desired output device. The I/O interface 1003 can be configured for allowing other systems to communicate with the system 1001. For example, the I/O interface 1003 can allow one or more remote computer(s) to access information, input information, and/or remotely instruct the system 1001 to perform one or more of the tasks described herein. The I/O interface 1003 can be configured for allowing communication with one or more remote data sources.

For example, the I/O interface 1003 can allow one or more remote data source(s) to access information, input information, and/or remotely instruct the system 1001 to perform one or more of the tasks described herein.

The database 1007 provides persistent data storage for system 1001. While the term "database" is primarily used, a memory or other suitable data storage arrangement may provide the functionality of the database 1007. In alternative embodiments, the database 1007 can be integral to or separate from the system 1001 and can operate on one or more computers. The database 1007 preferably provides non-volatile data storage for any information suitable to support the operation of the system 1001, including various types of data discussed further herein.

The analysis engine 1005 can be configured for analyzing stress and strain of rotor blade 101 during the design phase. Further, the analysis engine 1005 can be configured to optimize the tailoring of at least one of the support network 123, and other rotor blade components, such as upper skin 119 and lower skin 121. The analysis engine 1005 can be configured to analyze and optimize the tailoring characteristics of the rotor blade 101 in conjunction with one or more criteria, such as beam stiffness, chord stiffness, and torsional stiffness. The analysis engine 1005 can include various combinations of one or more processors, memories, and software components.

The methods and apparatuses described herein can advantageously provide at least one of the following: reduced engineering time and costs, reduced manufacturing time and costs, and can reduce labor, tooling, reduce component weight, reduced manufacturing footprint and material costs for designing and manufacturing a rotor blade.

Terms such as "first" and "second" are used only to differentiate features and not to limit the different features to a particular order or to a particular quantity.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. An airfoil member having a root end, a tip end, a leading edge, and a trailing edge, the airfoil member comprising:
an upper skin;

a lower skin; and a support network having a plurality of interconnected support members in a lattice arrangement, the support network being configured to provide tailored characteristics of the airfoil member;

wherein the support network comprises a plurality of closely compacted portions including a first closely compacted portion, a second closely compacted portion, a third closely compacted portion, and a fourth closely compacted portion;

wherein the plurality of closely compacted portions is adjacent to the leading edge;

wherein the first closely compacted portion has a greater density than each of the second closely compacted portion, the third closely compacted portion, and the fourth closely compacted portion.

2. The airfoil member according to claim 1, wherein at least one of the upper skin and the lower skin are configured to provide tailored characteristics of the airfoil member.

3. The airfoil member according to claim 1, wherein the plurality of interconnected support members define a plurality of openings, the plurality of openings comprising at least one of the following shapes: square, triangle, rectangle, pentagon, octagon, and trapezoid.

4. The airfoil member according to claim 1, wherein the support network comprises an open cell portion, wherein the plurality of closely compacted portions has a greater cell density than the open cell portion.

5. The airfoil member according to claim 1, wherein the airfoil member is one piece.

6. The airfoil member according to claim 1, wherein the first closely compacted portion extends up to one-fifth of a chordwise length of the airfoil member.

7. The airfoil member according to claim 1, wherein the second closely compacted portion is disposed in an upper portion above a chordwise axis of the airfoil member and is adjacent to the upper skin.

8. The airfoil member according to claim 1, wherein the third closely compacted portion is disposed in a lower portion below a chordwise axis of the airfoil member and is adjacent to the lower skin.

9. The airfoil member according to claim 1, wherein the fourth closely compacted portion is disposed aft of the first closely compacted portion.

10. The airfoil member according to claim 1, wherein the density of the fourth closely compacted portion is less than each of the first compacted portion, the second compacted portion, and the third compacted portion.

11. An airfoil member having a root end, a tip end, a leading edge, and a trailing edge, the airfoil member comprising:

an upper skin;

a lower skin; and a support network having a plurality of interconnected support members in a lattice arrangement, the support network being configured to provide tailored characteristics of the airfoil member;

wherein the support network comprises a plurality of open cell portions in the support network including a first open cell portion, a second open cell portion, a third open cell portion, and a fourth open cell portion;

the first open cell portion is adjacent to the trailing edge and has a density less than each of the second open cell portion, the third open cell portion, and the fourth open cell portion.

12. The airfoil member according to claim 11, wherein at least one of the upper skin and the lower skin are configured to provide tailored characteristics of the airfoil member.

13. The airfoil member according to claim 11, wherein the plurality of interconnected support members define a plurality of openings, the plurality of openings comprising at least one of the following shapes: square, triangle, rectangle, pentagon, octagon, and trapezoid.

14. The airfoil member according to claim 11, wherein the airfoil member is one piece.

* * * * *